US012737092B2

(12) United States Patent
Kong et al.

(10) Patent No.: US 12,737,092 B2
(45) Date of Patent: Sep. 15, 2026

(54) METHOD, TERMINAL, AND STORAGE MEDIUM FOR DISPLAYING APPLICATION INTERFACES OF SPLIT-SCREEN APPLICATIONS

(71) Applicant: GUANGDONG OPPO MOBILE TELECOMMUNICATIONS CORP., LTD., Dongguan (CN)

(72) Inventors: Fanxiu Kong, Dongguan (CN); Han Li, Dongguan (CN); Miao Yu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 308 days.

(21) Appl. No.: 18/476,846

(22) Filed: Sep. 28, 2023

(65) Prior Publication Data

US 2024/0019977 A1 Jan. 18, 2024

Related U.S. Application Data

(63) Continuation of application No. PCT/CN2022/079538, filed on Mar. 7, 2022.

(30) Foreign Application Priority Data

Apr. 9, 2021 (CN) ........................ 202110382817.X

(51) Int. Cl.
*G06F 3/0481* (2022.01)
*G06F 3/0485* (2022.01)

(52) U.S. Cl.
CPC .......... *G06F 3/0481* (2013.01); *G06F 3/0485* (2013.01); *G06F 2203/04803* (2013.01)

(58) Field of Classification Search
CPC ................. G06F 3/0481; G06F 3/0485; G06F 2203/04803; G06F 3/04847; G06F 3/0486; G06F 9/451; G06F 3/04886
See application file for complete search history.

(56) References Cited

U.S. PATENT DOCUMENTS 9,021,386 B1 * 4/2015 Rasmussen ........... G06F 3/0485 715/785
9,250,761 B2 * 2/2016 Vranjes .................. G06F 9/451
(Continued)

FOREIGN PATENT DOCUMENTS

CN 102411479 A 4/2012
CN 106293772 A 1/2017
(Continued)

OTHER PUBLICATIONS

Macmostvideo: “Mac Basics : How To Use Split View”, mailed Nov. 25, 2020 (2 pages).
(Continued)

*Primary Examiner* — Kenny Nguyen
(74) *Attorney, Agent, or Firm* — Ladas & Parry LLP

(57) ABSTRACT

The present disclosure provides a method, a terminal, and a storage medium for displaying application interfaces. The method includes displaying the application interfaces of a first group of split-screen applications among m split-screen applications in a split-screen manner in a display screen; wherein each group of split-screen applications includes n adjacent split-screen applications among the m split-screen applications, m being an integer greater than or equal to n, and n being an integer greater than or equal to 2; receiving an application switching operation; and displaying the application interfaces of a second group of split-screen applications among the m split-screen applications in the split-screen manner in the display screen based on the application switching operation; wherein the second group of split-
(Continued)

screen applications is partially or fully different from the first group of split-screen applications.

18 Claims, 19 Drawing Sheets

(56) References Cited

U.S. PATENT DOCUMENTS

| | | | | |
|---|---|---|---|---|
| 9,298,341 | B2 * | 3/2016 | Kim | G06F 3/04883 |
| 9,600,159 | B2 * | 3/2017 | Lawson | G06F 3/04883 |
| 9,785,340 | B2 * | 10/2017 | Lemay | G06F 3/04817 |
| 10,474,477 | B2 * | 11/2019 | Yankovich | G06F 9/4451 |
| 10,996,844 | B2 * | 5/2021 | Takikawa | G01C 21/3664 |
| 11,966,657 | B2 * | 4/2024 | Matsumura | G06F 1/1652 |
| 12,254,174 | B2 * | 3/2025 | Xu | G06F 1/1677 |
| 2009/0109184 | A1 * | 4/2009 | Kim | G06F 3/0483 345/173 |
| 2010/0088634 | A1 * | 4/2010 | Tsuruta | G06F 3/0481 715/788 |
| 2010/0248788 | A1 * | 9/2010 | Yook | G06F 3/04886 455/566 |
| 2011/0175930 | A1 * | 7/2011 | Hwang | G06F 3/0482 345/660 |
| 2011/0314004 | A1 * | 12/2011 | Mehta | G06F 16/40 707/723 |
| 2012/0081307 | A1 * | 4/2012 | Sirpal | G06F 3/0488 345/173 |
| 2012/0162266 | A1 * | 6/2012 | Douglas | G06T 11/60 345/677 |
| 2012/0240054 | A1 * | 9/2012 | Webber | G06Q 10/107 715/752 |
| 2013/0080958 | A1 * | 3/2013 | Sirpal | G06F 1/1618 715/769 |
| 2013/0321340 | A1 * | 12/2013 | Seo | G06F 3/0486 345/174 |
| 2014/0026062 | A1 * | 1/2014 | Proudfoot | G06Q 30/00 715/740 |
| 2014/0053097 | A1 * | 2/2014 | Shin | G06F 9/451 715/779 |
| 2014/0089832 | A1 * | 3/2014 | Kim | G06F 3/04883 715/788 |
| 2014/0325410 | A1 * | 10/2014 | Jung | G06F 3/0488 715/765 |
| 2014/0325431 | A1 * | 10/2014 | Vranjes | G06F 3/04847 715/788 |
| 2014/0333674 | A1 * | 11/2014 | Lawson | G09G 5/42 345/684 |
| 2015/0015520 | A1 * | 1/2015 | Narita | G06F 3/04883 345/173 |
| 2015/0067591 | A1 * | 3/2015 | Nancke-Krogh | G06F 9/451 715/804 |
| 2015/0309689 | A1 * | 10/2015 | Jin | G06F 3/0486 715/765 |
| 2015/0363066 | A1 * | 12/2015 | Lemay | G06F 3/04883 345/173 |
| 2015/0365306 | A1 * | 12/2015 | Chaudhri | H04N 21/47205 715/753 |
| 2016/0139798 | A1 * | 5/2016 | Takikawa | G06F 3/0482 345/173 |
| 2016/0179341 | A1 * | 6/2016 | Cho | G06F 3/04886 715/769 |
| 2016/0357358 | A1 | 12/2016 | Forster et al. | |
| 2017/0083226 | A1 * | 3/2017 | Cho | G06F 3/04842 |
| 2018/0329550 | A1 * | 11/2018 | Dellinger | G06F 3/0416 |
| 2019/0250810 | A1 * | 8/2019 | Yamauchi | H04N 1/00474 |
| 2022/0083214 | A1 * | 3/2022 | Walkin | G06F 9/542 |
| 2022/0326816 | A1 * | 10/2022 | Walkin | G06F 3/04883 |
| 2023/0236720 | A1 * | 7/2023 | Opara | G06F 3/04886 715/769 |
| 2023/0259272 | A1 * | 8/2023 | Xu | G06F 3/04817 345/173 |
| 2023/0297308 | A1 * | 9/2023 | Matsumura | G06F 3/04883 345/156 |

FOREIGN PATENT DOCUMENTS

| | | |
|---|---|---|
| CN | 106445308 A | 2/2017 |
| CN | 107948705 A | 4/2018 |
| CN | 110333818 A | 10/2019 |

OTHER PUBLICATIONS

European Search Report, European Patent Application No. 22783827.3, mailed Sep. 13, 2024 (12 pages).

International Search Report and Written Opinion, International Application No. PCT/CN2022/079538, mailed Apr. 28, 2022 (13 pages).

* cited by examiner

FIG. 18

| First display module | 2001 |
|---|---|
| First receiving module | 2002 |
| Second display module | 2003 |

METHOD, TERMINAL, AND STORAGE MEDIUM FOR DISPLAYING APPLICATION INTERFACES OF SPLIT-SCREEN APPLICATIONS

CROSS-REFERENCE TO RELATED APPLICATIONS

The present disclosure is a continuation-application of International (PCT) Patent Application No. PCT/CN2022/079538, filed on Mar. 7, 2022, which claims priority of China Patent Applicant No. 202110382817.X, filed on Apr. 9, 2021, the entire contents of which are hereby incorporated by reference in their entirety.

TECHNICAL FIELD

The present disclosure relates to the field of human-computer interaction technologies, and in particular to a method, an apparatus, a terminal, and a storage medium for displaying application interfaces.

BACKGROUND

A multi-window mode enables a terminal to display windows for multiple tasks at the same time, i.e., to display multiple application interfaces. In this way, the user may handle multiple tasks at the same time, for example, watching videos while shopping on the Internet, or checking e-mails and working documents at the same time.

In the related art, under the multi-window mode, the screen display region of the terminal is divided into multiple sub-regions, each of which displays a corresponding application program interface; or, the terminal displays the interface of a main task on the full screen while displaying interfaces of other applications through multiple floating windows.

SUMMARY OF THE DISCLOSURE

Embodiments of the present disclosure provide a method, a terminal, and a storage medium for displaying application interfaces.

In a first aspect, the present disclosure provides a method for displaying application interfaces, including: displaying the application interfaces of a first group of split-screen applications among m split-screen applications in a split-screen manner in a display screen; wherein each group of split-screen applications includes n adjacent split-screen applications among the m split-screen applications, m being an integer greater than or equal to n, and n being an integer greater than or equal to 2; receiving an application switching operation; and displaying the application interfaces of a second group of split-screen applications among the m split-screen applications in the split-screen manner in the display screen based on the application switching operation; wherein the second group of split-screen applications is partially or fully different from the first group of split-screen applications.

In a second aspect, the present disclosure provides a terminal, including a processor and a memory; wherein the memory stores at least one instruction, at least one segment of a program, a code set, or an instruction set; when the at least one instruction, the at least one segment of the program, the code set, or the instruction set is loaded and executed by the processor, the processor is caused to perform the method as above.

In a third aspect, the present disclosure provides a computer-readable storage medium, storing at least one computer program; wherein when the at least one computer program is loaded and executed by a processor, the processor is caused to perform the method as above.

BRIEF DESCRIPTION OF THE DRAWINGS

FIG. 18 is a flowchart of a method for displaying application interfaces according to still another embodiment of the present disclosure.

DETAILED DESCRIPTION

In order to make the purpose, technical solutions and advantages of the present disclosure clearer, the following embodiments of the present disclosure will be described in further detail in conjunction with the accompanying drawings.

References to "more than one" in this document refer to two or more. The term "and/or" describes an association relationship of associated objects, indicating that three kinds of relationships may exist, e.g., A and/or B may be indicated as: A alone, both A and B, and B alone. The character "/" generally indicates that the associated objects are in an "or" relationship.

Figure 1:
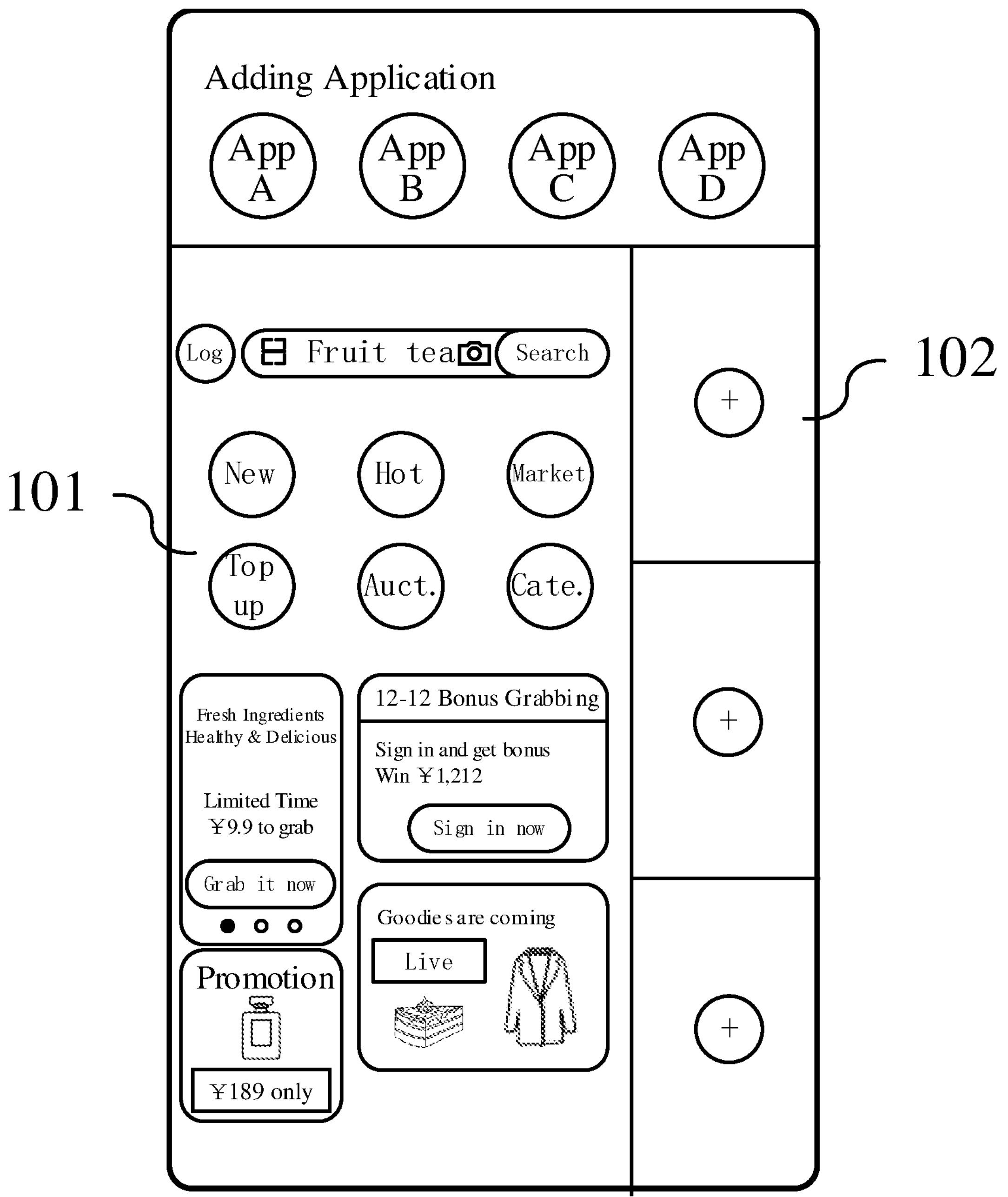
FIG. 1 is a schematic view of a split-screen display for application interfaces according to the related art.

In the related art, under the multi-window mode, the screen display region of the terminal is divided into multiple sub-regions, each of which displays a corresponding application program interface; or, the terminal displays the interface of a main task on the full screen while displaying interfaces of other applications through multiple floating windows, etc., so as to ensure that the display screen displays the application interfaces of all the split-screen applications at the same time, facilitating browsing by the user. As illustrated in FIG. 1, after a terminal receives a split-screen operation, a display region of a display screen is divided to obtain a main display region 101 and three sub-display regions 102. The user may add a split-screen application such that the terminal displays an application interface of the split-screen application through a sub-display region 102, and also adjust the display positions of the application interfaces, for adjusting an application interface desired to be viewed to the main display region 101 so as to clearly browse a particular application interface. However, in order to facilitate portability, the size of the display screen is usually small, and when the user opens multiple split-screen applications at the same time, the above mode for displaying application interfaces makes the display size of each application interface smaller. In this way, the user may not be able to clearly browse each of the application interfaces. In addition, the way of the floating window may also cause a certain degree of obstruction of the other application interfaces, and the size of the display region of the floating window is smaller, such that the usability of some applications is low under the too small display size.

In order to solve the above technical problems, the present disclosure provides a method for displaying application interfaces, which is applied to a terminal having a split-screen function. For m split-screen applications, the terminal can simultaneously display the application interfaces of n of the m split-screen applications, and switch the application interfaces based on the user's operation, thereby ensuring that the user may clearly browse the application interfaces and can freely combine the application interfaces for displaying according to actual needs, which improves the practicability of the split-screen function.

Figure 2:
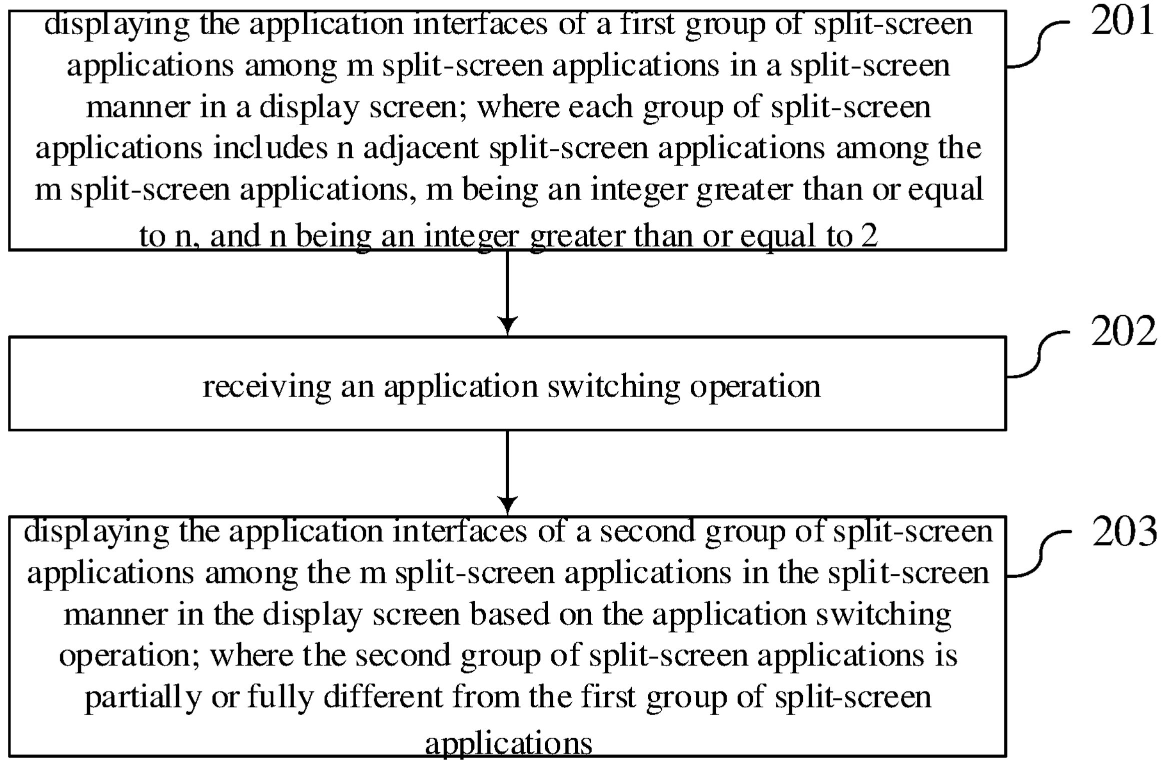
FIG. 2 is a flowchart of a method for displaying application interfaces according to an embodiment of the present disclosure.

FIG. 2 is a flowchart of a method for displaying application interfaces according to an embodiment of the present disclosure. The present embodiment is illustrated with the method being applied to a terminal having a split-screen function as an example. The method includes the following operations at blocks illustrated in FIG. 2.

At block 201: displaying the application interfaces of a first group of split-screen applications among m split-screen applications in a split-screen manner in a display screen; where each group of split-screen applications includes n adjacent split-screen applications among the m split-screen applications, m being an integer greater than or equal to n, and n being an integer greater than or equal to 2.

The split-screen application is an application split-screen that can be displayed in the split-screen manner. It is also noted that the compatibility of the split-screen manner means that the application interface of the split-screen application can be displayed in a partial region of the entire display region of the display screen.

In some embodiments, the display screen of the terminal can display the application interfaces of at most n split-screen applications at the same time. However, the total number of the split-screen applications may be greater than or equal to n. That is, when the number of the split-screen applications reaches n, the user is still able to continue to add split-screen applications, but the terminal is only able to display the n split-screen applications among them. The user may, by means of a corresponding interactive operation, cause the terminal to display n split-screen applications desired to be used among the m split-screen applications that the user wishes to use.

For convenience of expression, in the embodiments of the present disclosure, the n split-screen applications currently being displayed are referred to as the first group of split-screen applications, and n split-screen applications switched to be displayed based on an application switching operation are referred to as a second group of split-screen applications. The terminal does not actually group the split-screen applications.

In some embodiments, there exists a certain order of arrangement of the m split-screen applications, with n applications as a group, and the terminal only displays the application interfaces of one group of split-screen applications at the same time. Among the m split-screen applications, there may be an intersection between two adjacent groups of split-screen applications, and the intersection may be only one split-screen application; or, there is no intersection between two adjacent groups of split-screen applications.

Schematically, every two split-screen applications are taken as a group, and there are currently a total of four split-screen applications, which are application A, application B, application C, and application D. Application A and application B may be a group, application B and application C may be a group, and application C and application D may be a group. The group of application A and application B and the group of application B and application C are two adjacent groups, and the group of application B and application C and the group of application C and application D are two adjacent groups.

At block 202: receiving an application switching operation.

In some embodiments, when the total number of the split-screen applications is greater than n, the terminal can receive the application switching operation, and a trigger condition for the application switching operation is pre-set in the terminal. The user may operate in accordance with the trigger condition to switch some or all of the n split-screen applications currently displayed.

At block 203: displaying the application interfaces of a second group of split-screen applications among the m split-screen applications in the split-screen manner in the display screen based on the application switching operation; where the second group of split-screen applications is partially or fully different from the first group of split-screen applications.

In some embodiments, the terminal switches some or all of the applications in the first group of split-screen applications to display the second group of split-screen applications based on the application switching operation, i.e., switching i split-screen applications among the n split-screen applications, i being a positive integer less than or equal to n. It is noted that the first group of split-screen applications refers to a group of split-screen applications displayed before the terminal receives the application switching operation, the second group of split-screen applications refers to a group of split-screen applications displayed after the terminal receives the application switching operation, and the two groups may not be two adjacent groups of split-screen applications. The terminal is required to determine the second group of split-screen applications in accordance with the actual operation of the user.

Figure 3:
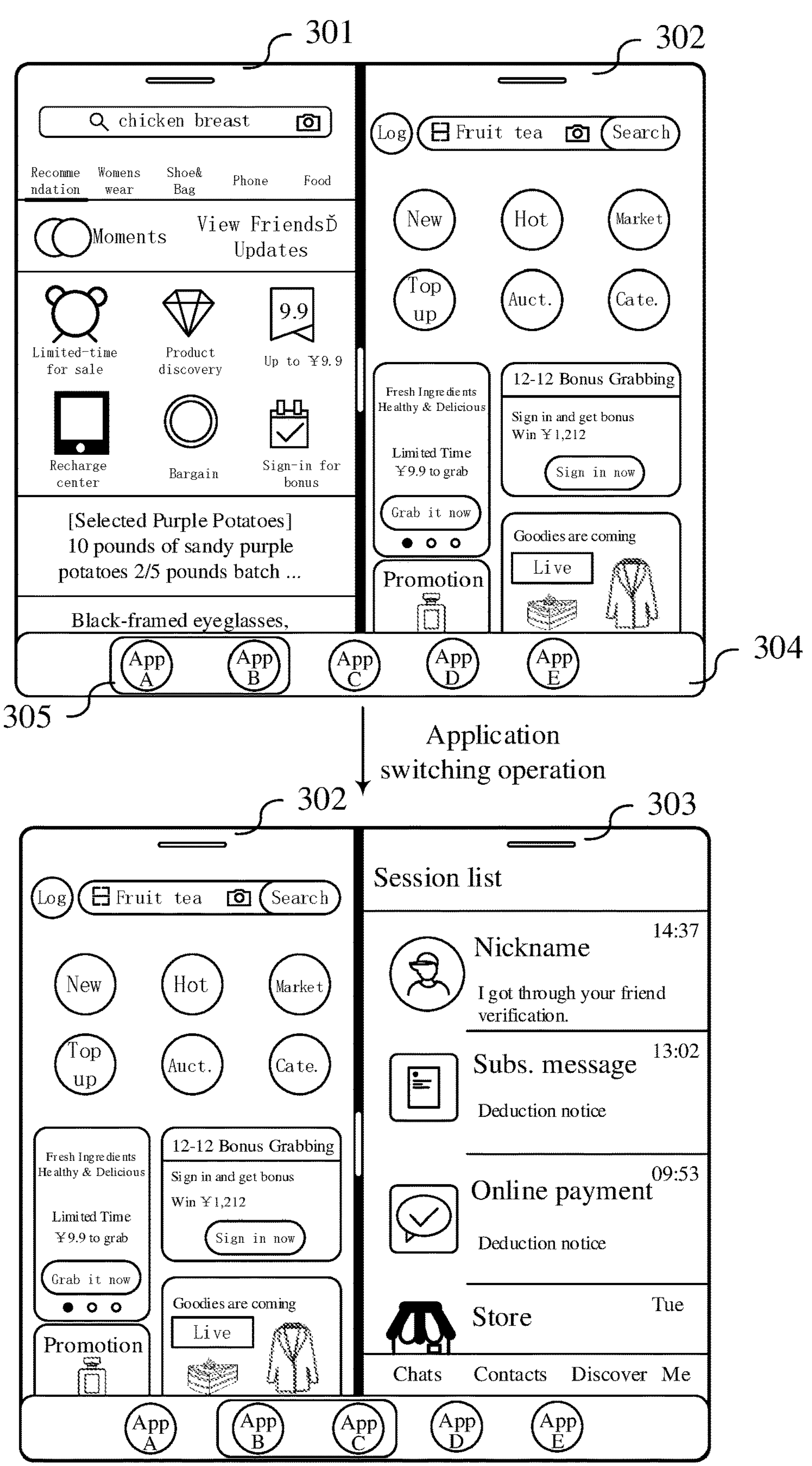
FIG. 3 is a schematic view of an application switching process according to an embodiment of the present disclosure.

Schematically, as illustrated in FIG. 3, there are currently a total of five split-screen applications. Before the terminal receives the application switching operation, the interface 301 of application A and the interface 302 of application B are displayed in the display screen. The user causes the terminal to display the second group of split-screen applications through the application switching operation, i.e., after the terminal receives the application switching operation, the terminal displays the interface 302 of application B and the interface 303 of application C. The user may also, through the application switching operation, cause the terminal from displaying the interface 301 of application A and the interface 302 of application B to displaying the interface 303 of application C and the interface of application D, etc.

In summary, in the embodiments of the present disclosure, the display screen simultaneously displays the application interfaces of n split-screen applications, and the user may control more applications to be displayed in the split-screen manner, i.e., the number of split-screen applications is greater than the upper limit of the number of application interfaces simultaneously displayed on the display screen. The user may realize the rapid switching of the application interfaces of the split-screen applications in the display screen through the application switching operation. Compared to the way of displaying the application interfaces of all split-screen applications in the related art where the display region is divided into several sub-regions and the application interfaces of all the split-screen applications are displayed at the same time, the user may turn on multiple split-screen applications and cause the terminal to display the applications that need to be processed at present, thereby avoiding the situation that displaying the interfaces of all split-screen applications at the same time results in the size of each application interface being too small and the usability thereof being low, thus reasonably utilizing the display screen to carry out multi-tasking and improving the practicability of the split-screen function.

In some embodiments, the application switching operation is a first sliding operation of the application interfaces within the display screen.

The displaying the application interfaces of a second group of split-screen applications among the m split-screen applications in the split-screen manner in the display screen based on the application switching operation may include the following.

Determining the second group of split-screen applications based on a sliding direction and a sliding distance of the first sliding operation.

Displaying the application interfaces of the second group of split-screen applications in the split-screen manner in the display screen.

In some embodiments, the determining the second group of split-screen applications based on a sliding direction and a sliding distance of the first sliding operation may include the following.

In response to an existence of other split-screen applications after the first group of split-screen applications among the m split-screen applications in the sliding direction of the first sliding operation, performing the step of determining the second group of split-screen applications based on a sliding direction and a sliding distance of the first sliding operation.

The method may further include the following.

In response to no existence of other split-screen applications after the first group of split-screen applications among the m split-screen applications in the sliding direction of the first sliding operation, not responding to the first sliding operation.

In some embodiments, the display region of the display screen includes an interface display region and a menu bar display region, the interface display region being configured to display the application interfaces of split-screen applications, and the menu bar display region being configured to display split-screen application identifiers of the m split-screen applications; the application switching operation is a clicking operation on a target split-screen application identifier in the menu bar display region.

The displaying the application interfaces of a second group of split-screen applications among the m split-screen applications in the split-screen manner in the display screen based on the application switching operation may include the following.

Determining the second group of split-screen applications based on a target split-screen application corresponding to the target split-screen application identifier and an order in which the m split-screen applications are arranged, where the second group of split-screen applications includes the target split-screen application.

Displaying the application interfaces of the second group of split-screen applications in the split-screen manner in the display screen.

In some embodiments, a slider is further displayed in the menu bar display region, so as to frame and select the split-screen application identifiers of the n split-screen applications currently displayed, and the application switching operation is a drag-and-drop operation on the slider.

The displaying the application interfaces of a second group of split-screen applications among the m split-screen applications in the split-screen manner in the display screen based on the application switching operation may include the following.

Determining the second group of split-screen applications from the m split-screen applications based on an end position of the drag-and-drop operation.

Displaying the application interfaces of the second group of split-screen applications in the split-screen manner in the display screen.

In some embodiments, after the displaying the application interfaces of a first group of split-screen applications among m split-screen applications in a split-screen manner in a display screen, the method further includes the following.

Receiving an application add operation and displaying an application selection list, where the application selection list includes an application identifier corresponding to at least one application that is not enabled with the split-screen function.

Receiving a triggering operation on a target application identifier in the application selection list, and adding a target application corresponding to the target application identifier to the split-screen applications.

Displaying the application interfaces of a third group of split-screen applications among the m+1 split-screen applications in the split-screen manner in the display screen, the third group of split-screen applications including the target application.

In some embodiments, the receiving an application add operation and displaying an application selection list may include the following.

Receiving a triggering operation on a toolbar display control and displaying a toolbar, where the toolbar display control is located at a junction of two adjacent application interfaces in the display screen, and the toolbar includes an application add control; receiving a triggering operation on the application add control, and displaying the application selection list in the display screen.

Or, receiving a second sliding operation within an application add region and displaying the application selection list in the display screen, where the application add region is located at a junction of two adjacent application interfaces in the display screen.

Or, receiving a third sliding operation of which a sliding start point is located at a predetermined edge of the display screen, and displaying the application selection list in a floating-window manner overlaid on the application interfaces of the first group of slit-screen applications.

In some embodiments, the receiving a triggering operation on a target application identifier in the application selection list, and adding a target application corresponding to the target application identifier to the split-screen applications may include the following.

Receiving a click operation on the target application identifier and determining the target application as a (m+1)th split-screen application.

Or, receiving a drag-and-drop operation on the target application identifier, and adding the target application to the split-screen applications and determining an order in which the m+1 split-screen applications are arranged based on an end position of the drag-and-drop operation.

In some embodiments, after the displaying the application interfaces of a first group of split-screen applications among m split-screen applications in a split-screen manner in a display screen, the method further includes the following.

Receiving a triggering operation on an interface deletion control in the target application interface in the display screen.

Removing the split-screen application corresponding to the target application interface from the m split-screen operations, and determining a fourth group of split-screen applications from the m−1 split-screen applications; where there is one different split-screen application between the fourth group of split-screen applications and the first group of split-screen applications.

Displaying the application interfaces of the fourth group of split-screen applications in the split-screen manner in the display screen.

In some embodiments, after the displaying the application interfaces of a first group of split-screen applications among m split-screen applications in a split-screen manner in a display screen, the method further includes the following.

Receiving a triggering operation on a toolbar display control and displaying a toolbar, where the toolbar display control is located at a junction of two adjacent application interfaces in the display screen, and the toolbar includes an application exchange control; receiving a triggering operation on the application exchange control, exchanging a display position of the application interfaces on both sides of the toolbar display control in the display screen, and updating an order in which the m split-screen applications are arranged.

Or, receiving a dragging operation on the application interfaces in the display screen, updating an order in which the m split-screen applications are arranged based on an end position of the dragging operation, and displaying the application interfaces of a fifth group of split-screen applications in the display screen; where the fifth group of split-screen applications includes the split-screen application corresponding to the target application interface.

In some embodiments, after the displaying the application interfaces of a first group of split-screen applications among m split-screen applications in a split-screen manner in a display screen, the method further includes the following.

Receiving a triggering operation on a combination save control and determining the m split-screen applications as a split-screen application combination.

Generating a combination identifier of the split-screen application combination and displaying the combination identifier in an application presentation interface.

In response to a triggering operation on the combination identifier in a full-screen display state, controlling the applications in the split-screen application combination to enter a split-screen state, and displaying the n split-screen applications among the m split-screen applications in the split-screen manner in the display screen.

In some embodiments, the display region of the display screen includes an interface display region and a menu bar display region, the interface display region being configured to display the application interfaces of split-screen applications, and the menu bar display region being configured to display a search control.

In some embodiments, after the displaying the application interfaces of a first group of split-screen applications among m split-screen applications in a split-screen manner in a display screen, the method further includes the following.

Receiving a triggering operation on the search control and displaying a search bar, where the search bar includes a search content input region and a search application identifier, the search application identifier being an application identifier of a split-screen application that supports a search function among the m split-screen applications.

In response to obtaining a search content through the search content input region, displaying the application interfaces of a sixth group of split-screen applications in the display screen, where the sixth group of split-screen applications includes the split-screen application corresponding to the search application identifier, and the application interfaces of the sixth group of split-screen applications illustrate a search result for the search content.

In some embodiments, in response to obtaining a search content through the search content input region, the displaying the application interfaces of a sixth group of split-screen applications in the display screen may include the following.

Obtaining the search content in response to a content input operation in the search content input region.

Sending a broadcast message to the split-screen application corresponding to the search application identifier, where the broadcast message includes the search content and is configured to instruct the split-screen application to search content.

Displaying the application interfaces of the sixth group of split-screen applications in the display screen based on the search result from the split-screen application corresponding to the search application identifier.

Figure 4:
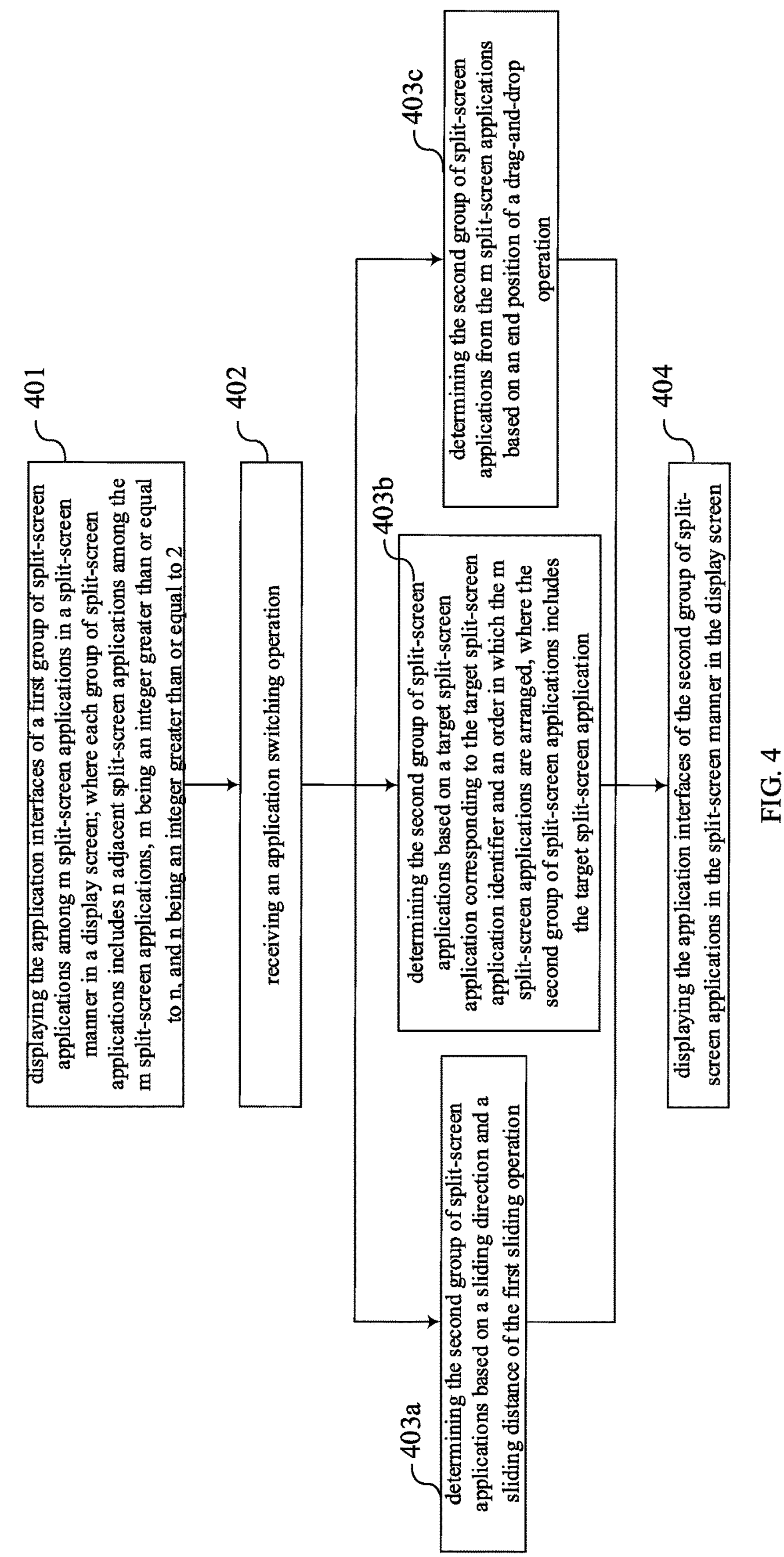
FIG. 4 is a flowchart of a method for displaying application interfaces according to another embodiment of the present disclosure.

In order to facilitate rapid switching of the split-screen applications by the user, the terminal provides multiple ways to realize the application switching operation. FIG. 4 is a flowchart of a method for displaying application interfaces according to another embodiment of the present disclosure. The present embodiment is illustrated with the method being applied to a terminal having a split-screen function as an example. The method includes the following operations at blocks illustrated in FIG. 4.

At block 401: displaying the application interfaces of a first group of split-screen applications among m split-screen applications in a split-screen manner in a display screen; where each group of split-screen applications includes n adjacent split-screen applications among the m split-screen applications, m being an integer greater than or equal to n, and n being an integer greater than or equal to 2.

At block 402: receiving an application switching operation.

Specific implementations of step 401 and step 402 may refer to step 201 and step 202 above, and the embodiments of the present disclosure will not be repeated herein.

In some embodiments, the present embodiment provides three application switching operations, and the process of the terminal determining the second group of split-screen applications based on the three application switching operations corresponds to the following three steps, i.e., step 403*a*, step 403*b*, and step 403*c* are three optional implementations and are not steps to be performed successively by the terminal. The terminal determines the steps to be performed based on the specific type of the application switching operation.

At block 403*a*: determining the second group of split-screen applications based on a sliding direction and a sliding distance of the first sliding operation.

In some embodiments, the application switching operation is a first sliding operation of the application interfaces within the display screen. The method for displaying the application interfaces provided by the embodiments of the present disclosure is applied to a terminal having a large-sized display screen (e.g., a folding mobile phone, a tablet computer, etc.). In order to facilitate the user to clearly view the application interface as well as to facilitate the user to switch the split-screen applications by the sliding operation, the application interfaces of the split-screen applications may be horizontally arranged, and the first sliding direction is consistent with the arrangement direction of the application interfaces (to the left or to the right); alternatively, the application interfaces of the split-screen applications may be vertically arranged, and the first sliding direction is consistent with the arrangement direction of the application interfaces (upward or downward).

It is noted that there may exist content within the application interfaces that can be switched to display by sliding. Therefore, the terminal first responds to a sliding event within the split-screen application when receiving the first sliding operation, and when the application cannot respond to the sliding event, the terminal determines that it receives the first sliding operation and determines the second group of split-screen applications.

Specifically, the terminal determines an application switching direction based on the sliding direction of the first sliding operation and determines an application switching number based on the sliding distance of the first sliding operation, and then determines the second group of split-screen applications based on the application switching direction and the application switching number.

As illustrated in FIG. 3, the terminal arranges the split-screen applications in the order of application A, application B, application C, application D, and application E. In a case where the terminal displays the application interfaces of application A and application B, when the terminal receives the first sliding operation from left to right, the terminal gradually moves the application interfaces of application A and application B from right to left along with the touch point of the first sliding operation and gradually enters the application interface of application C, and so on until the first sliding operation stops, at which time the terminal determines the second group of split-screen applications and stops switching the application interfaces.

Alternatively, when the terminal receives the first sliding operation and the sliding distance of the first sliding operation is less than a distance required to switch one split-screen application, the terminal switches one split-screen application by default, switching from displaying application A and application B to displaying application B and application C (i.e., switching to an adjacent group of split-screen applications), thereby enabling the user to switch the split-screen applications quickly without precisely controlling the sliding distance.

In some embodiments, the terminal determines whether to switch the split-screen applications based on the sliding direction of the first sliding operation and a position of the first group of split-screen applications among the m split-screen applications, and step 403*a* further includes the following.

In response to an existence of other split-screen applications after the first group of split-screen applications among the m split-screen applications in the sliding direction of the first sliding operation, performing the step of determining the second group of split-screen applications based on a sliding direction and a sliding distance of the first sliding operation.

Schematically, when the terminal displays the application interfaces of the split-screen applications that are horizontally arranged and the first sliding operation is a sliding operation to the left or to the right, as illustrated in FIG. 3, the terminal displays the application interfaces of application A and application B, and when a sliding operation from the right to the left is received, the terminal responds to the first sliding operation because there are other split-screen applications to the right of application B.

The method for displaying the application interface provided by embodiments of the present disclosure further includes the following.

In response to no existence of other split-screen applications after the first group of split-screen applications among the m split-screen applications in the sliding direction of the first sliding operation, not responding to the first sliding operation.

Schematically, when the terminal displays the application interfaces of the split-screen applications that are horizontally arranged and the first sliding operation is a sliding operation to the left or to the right, as illustrated in FIG. 3, the terminal displays the application interfaces of application A and application B, and when a sliding operation from the left to the right is received, the terminal does not respond to the first sliding operation because there is no other split-screen applications to the left of application A.

At block 403*b*: determining the second group of split-screen applications based on a target split-screen application corresponding to the target split-screen application identifier and an order in which the m split-screen applications are arranged, where the second group of split-screen applications includes the target split-screen application.

In some embodiments, the display region of the display screen includes an interface display region and a menu bar display region, the interface display region being configured to display the application interfaces of split-screen applications, and the menu bar display region being configured to display split-screen application identifiers of the m split-screen applications; the application switching operation is a clicking operation on a target split-screen application identifier in the menu bar display region. The split-screen application identifier may be an identifier such as an application icon or an application name of the split-screen application.

The size of the display screen of the terminal is limited, and when the number of split-screen applications is large (i.e., m is large), and when the split-screen application corresponding to the application interface that the user needs to view has a large number of split-screen applications spaced apart from the first group of split-screen applications, application switching by the first sliding operation on the application interfaces may result in the user needing to perform several first sliding operations for switching to the split-screen application that the user wants to use. Therefore, the terminal may further quickly switch the application interfaces of the split-screen applications based on a triggering operation on the split-screen application identifier in the menu bar.

Schematically, as illustrated in FIG. 3, an upper part of the display screen is an interface display region for displaying the application interfaces of the split-screen applications, and a lower part of the display screen is a menu bar display region 304 for displaying the menu bar, the menu bar including the split-screen application identifier of each split-screen application. The terminal currently displays the application interfaces of the first group of split-screen applications (application A and application B), and when a triggering operation on the split-screen application identifier corresponding to application E in the menu bar display region 304 is received, application D and application E are determined to be the second group of split-screen applications.

In some embodiments, the terminal determines the second group of split-screen applications based on a principle of a minimum number of applications spaced apart. For example, when the first group of split-screen applications is application A and application B, the terminal determines application B and application C as the second group of split-screen applications when a triggering operation on the split-screen application identifier corresponding to application C is received.

At block 403*c*: determining the second group of split-screen applications from the m split-screen applications based on an end position of a drag-and-drop operation.

In other embodiments, a slider is further displayed in the menu bar display region, so as to frame and select the split-screen application identifiers of the n split-screen applications currently displayed, and the application switching operation is a drag-and-drop operation on the slider. The slider may be set with a transparency (e.g., semi-transparent) to avoid completely covering the application identifiers; or the size of the slider is larger than the area corresponding to the n split-screen application identifiers and is displayed below the split-screen application identifiers, such that the user is able to view the application identifiers currently framed and selected by the slider.

In order to enable the user to clearly view the application interfaces, the application interface display region in the display screen has a larger size, and the menu bar display region has a smaller size. Therefore, the application identifiers in the menu bar are also smaller and closer to each other, and for some users, it may be more difficult to directly trigger the split-screen application identifier for application switching. In order to avoid the user from mistakenly triggering the split-screen application identifiers of other split-screen applications, the terminal may further switch the display of split-screen applications based on the drag-and-drop operation on the slider.

As illustrated in FIG. 3, the terminal currently displays the application interface of the first group of split-screen applications (application A and application B), and the slider 305 in the menu bar display region 304 frames and selects the split-screen application identifiers of application A and application B. When a drag-and-drop operation on the slider 305 is received, the terminal adsorbs the slider 305 at a touch point (or cursor) of the drag-and-drop operation, such that the slider 305 moves with the drag-and-drop operation. When the drag-and-drop operation stops, the terminal determines the split-screen applications corresponding to the application identifiers framed and selected by the slider 305 as the second group of split-screen applications.

Figure 5:
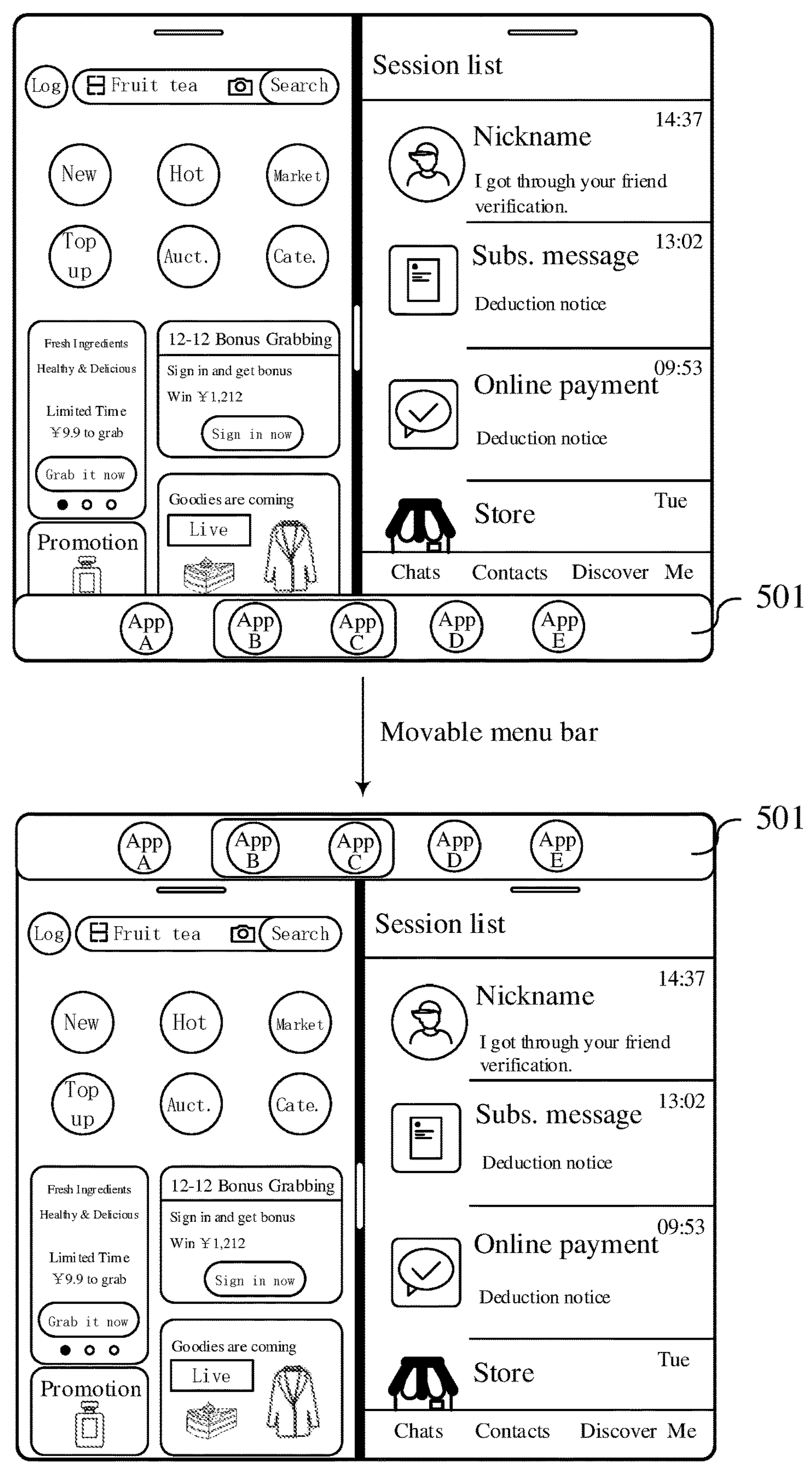
FIG. 5 is a schematic view of a movable menu bar according to an embodiment of the present disclosure.
Figure 6:
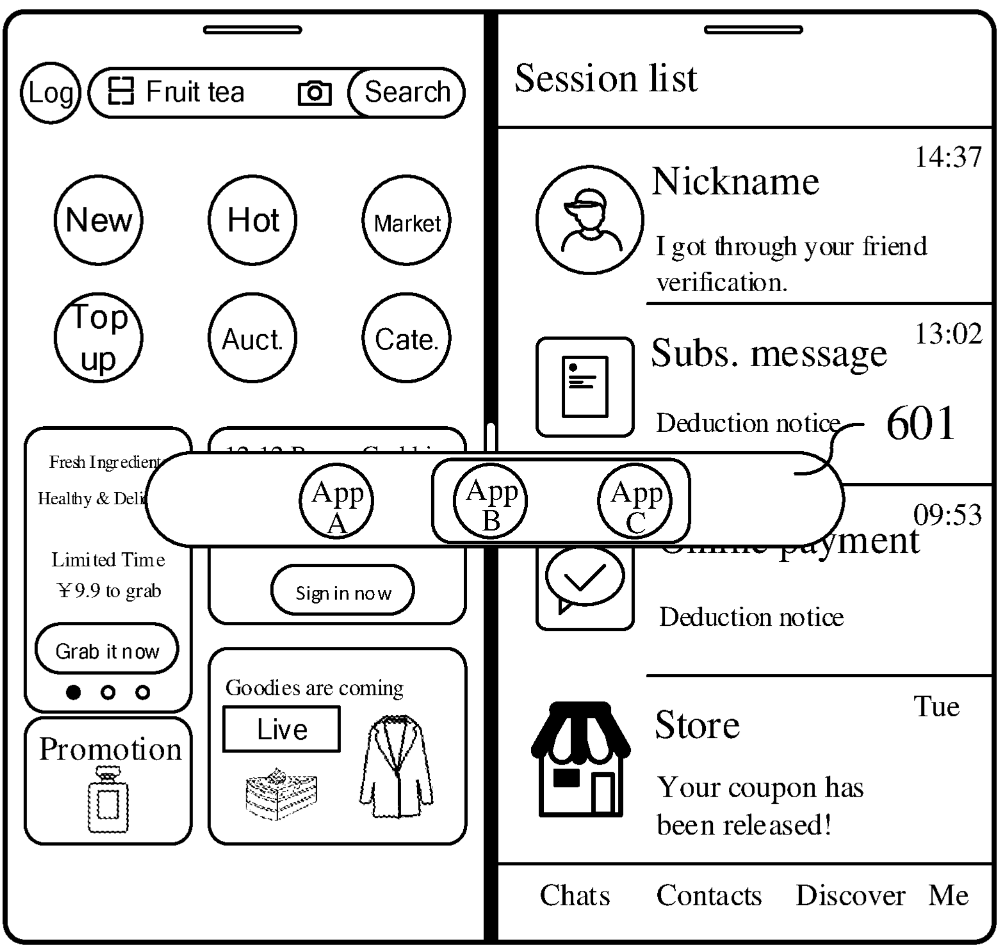
FIG. 6 is a schematic view illustrating application interfaces of split-screen applications and a menu bar according to an embodiment of the present disclosure.

In some embodiments, in order to facilitate user operation, the terminal may further move a display position of the menu bar based on the user's triggering operation. As illustrated in FIG. 5, the terminal by default displays the menu bar 501 at the bottom of the application interface, and the user may drag the menu bar 501 to other edge positions, such as dragging it to the top of the application interface, or to the left or right of the application interface, etc.; alternatively, as illustrated in FIG. 6, to display more fully the application interface of the split-screen application, the user may hide the menu bar by a first preset operation (e.g., a triggering operation on a closing control in the menu bar display region), and may evoke a floating window 601 by a second preset operation (e.g., a triggering operation on a menu bar display control in the display screen), and the terminal displays the menu bar through the floating window 601.

Step 404: displaying the application interfaces of the second group of split-screen applications in the split-screen manner in the display screen.

After the terminal determines the second group of split-screen applications based on the application switching operation, the terminal displays the application interfaces of the second group of split-screen applications in the split-screen manner in the display screen.

In the embodiments of the present disclosure, the terminal switches the split-screen applications based on the first sliding operation on the application interfaces, such that the application interface moves with the movement of the touch point of the user's sliding operation, which may improve the user experience of application switching. In addition, a menu bar is further displayed in the display screen, such that the user may quickly switch the applications by the triggering operation on the application identifier or by the drag-and-drop operation on the slider in the menu bar to avoid the situation that the user has to switch to the required split-screen application through several first-sliding operations when the number of split-screen applications is large, which simplifies the user's operation and improves the switching efficiency of split-screen applications.

In some embodiments, in order to realize that m applications are enabled with the split-screen function while the terminal can only display the application interfaces of n split-screen applications at the same time, the terminal realizes the split-screen function through a split-screen management application. When the terminal receives a split-screen operation under the state of full-screen display, the terminal opens the split-screen management application. The interface of the split-screen management application consists of application interfaces of split-screen applications, and the interface of the split-screen management application is displayed in full screen. The specific split-screen process is as follows: receiving the split-screen operation and opening the split-screen management application; displaying the application interfaces of the first group of split-screen applications through an interface display window of the split-screen management application. A view container component (Surface View) of the split-screen management application is composed of at least n sub-view container components in a certain arrangement, and the display size of each sub-view container component is the same (e.g., the height is the same as the height of the display screen, and the width is one-half of the width of the display screen). The specific process of realizing the split-screen function is as follows: mounting the application interface (Surface) of each split-screen application to a corresponding sub-view container component (i.e., mounted to the Surface of Surface View) in accordance with an order in which the split-screen applications are arranged; loading the sub-view container component corresponding to each split-screen application in the first group of split-screen applications through the interface display window of the split-screen management application; and displaying the interface display window in the display screen. When the terminal receives an application add operation, the application corresponding to the application add operation is determined as the (m+1)th split-screen application in accordance with the above steps, and the application interfaces of a group of split-screen applications including the application are displayed in the split-screen manner.

Figure 7:
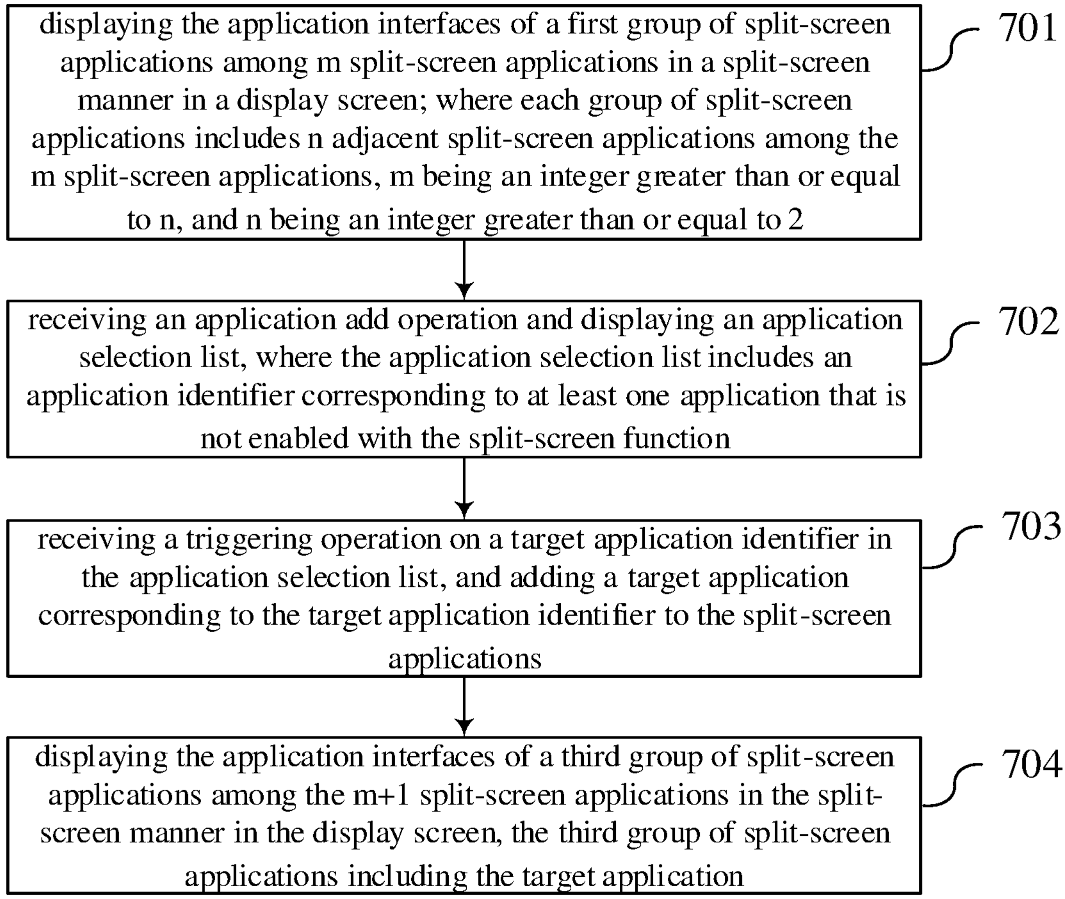
FIG. 7 is a flowchart of a method for displaying application interfaces according to further another embodiment of the present disclosure.

FIG. 7 is a flowchart of a method for displaying application interfaces according to further another embodiment of the present disclosure. The present embodiment is illustrated with the method being applied to a terminal having a split-screen function as an example. The method includes the following operations at blocks illustrated in FIG. 7.

At block 701: displaying the application interfaces of a first group of split-screen applications among m split-screen applications in a split-screen manner in a display screen; where each group of split-screen applications includes n adjacent split-screen applications among the m split-screen applications, m being an integer greater than or equal to n, and n being an integer greater than or equal to 2.

The specific implementation of step 701 may refer to step 201 above, and the embodiments of the present disclosure will not be repeated herein.

At block 702: receiving an application add operation and displaying an application selection list, where the application selection list includes an application identifier corresponding to at least one application that is not enabled with the split-screen function.

In addition to switching the split-screen applications, the user may continue to add a new split-screen application. When the application add operation is received, the terminal displays the application selection list for the user to select the application that needs to be enabled with the split-screen function. The embodiments of the present disclosure provide a variety of ways to trigger the display of the application selection list, and step 702 includes the following steps.

Step 702*a*: receiving a triggering operation on a toolbar display control and displaying a toolbar, where the toolbar display control is located at a junction of two adjacent application interfaces in the display screen, and the toolbar includes an application add control.

Step 702*b*: receiving a triggering operation on the application add control, and displaying the application selection list in the display screen.

Figure 8:
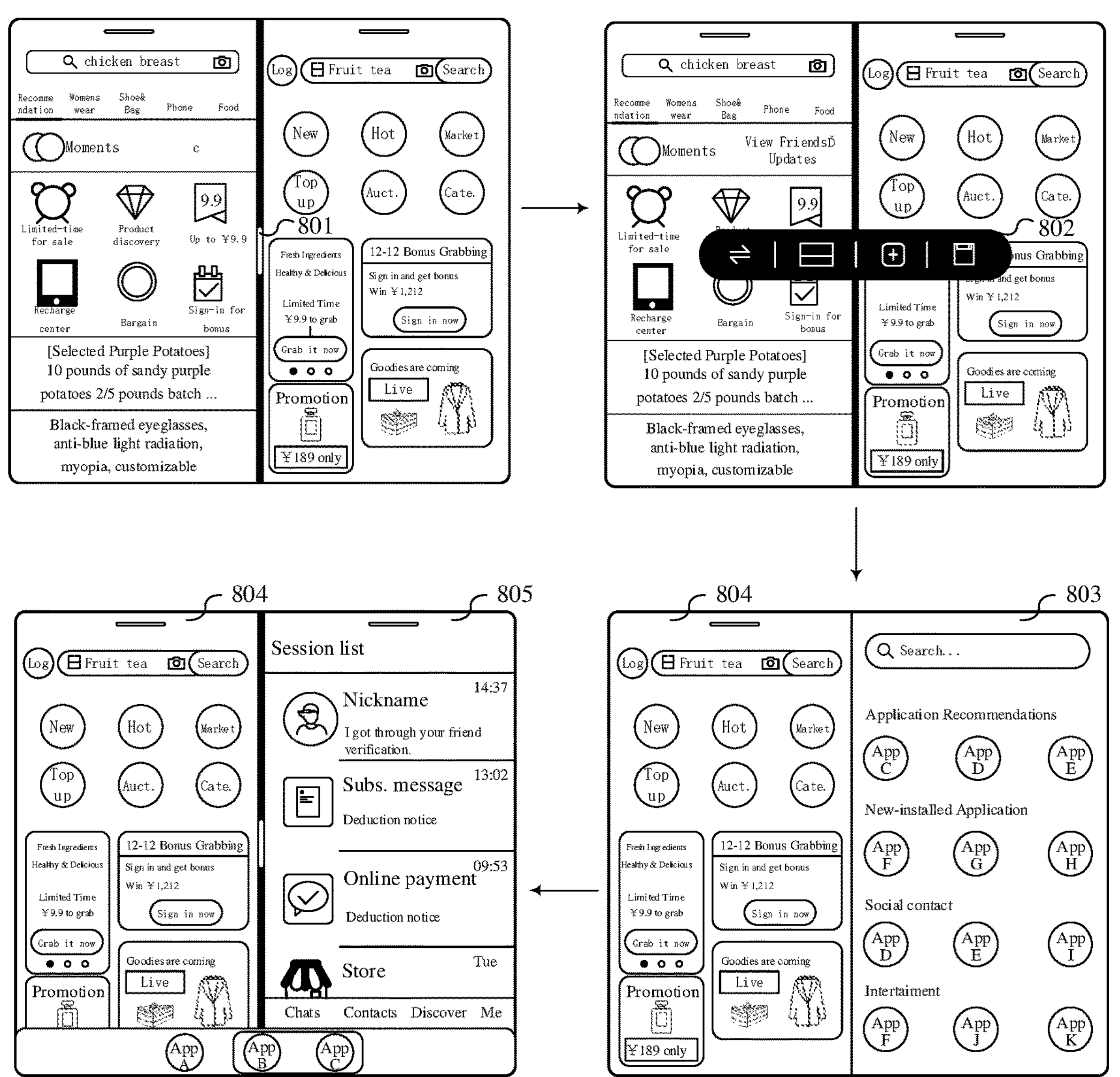
FIG. 8 is a schematic view of a process of adding a split-screen application according to an embodiment of the present disclosure.

As illustrated in FIG. 8, when the terminal displays the application interfaces of the first group of split-screen applications (Application A and Application B), a toolbar display control 801 is displayed at the junction of the application interfaces, and when a triggering operation on the toolbar display control 801 is received, the terminal displays a toolbar 802. The toolbar 802 includes a variety of controls, and in the figure, the third icon from the left to the right inside the toolbar 802 is the icon corresponding to the application add control. When receiving a triggering operation on the application add control, the terminal adds a split-screen application at the end of the m split-screen applications (i.e., the rightmost side shown in FIG. 8) in accordance with a preset order in which the split-screen applications are arranged, and the application interface shown on the display screen of the terminal switches rapidly from the first group of split-screen applications to the last n−1 split-screen applications, and an application selection list 803 is displayed within the display region of the nth application interface. Referring to FIG. 8, the terminal displays the application interface 804 of application B and the application selection list 803, and the application selection list 803 includes application identifiers corresponding to the applications that are not enabled with the split-screen function and support the split-screen function.

Alternatively, step 702*c*: receiving a second sliding operation within an application add region and displaying the application selection list in the display screen, where the application add region is located at a junction of two adjacent application interfaces in the display screen.

For the way of triggering to display the toolbar and triggering the application adding control in the toolbar to display the application selection list, the operation steps are more, and the display size of the control is too small which may lead to the user mistakenly touching. Therefore, the terminal may further provide a way of quickly triggering the display of the application selection list.

Figure 9:
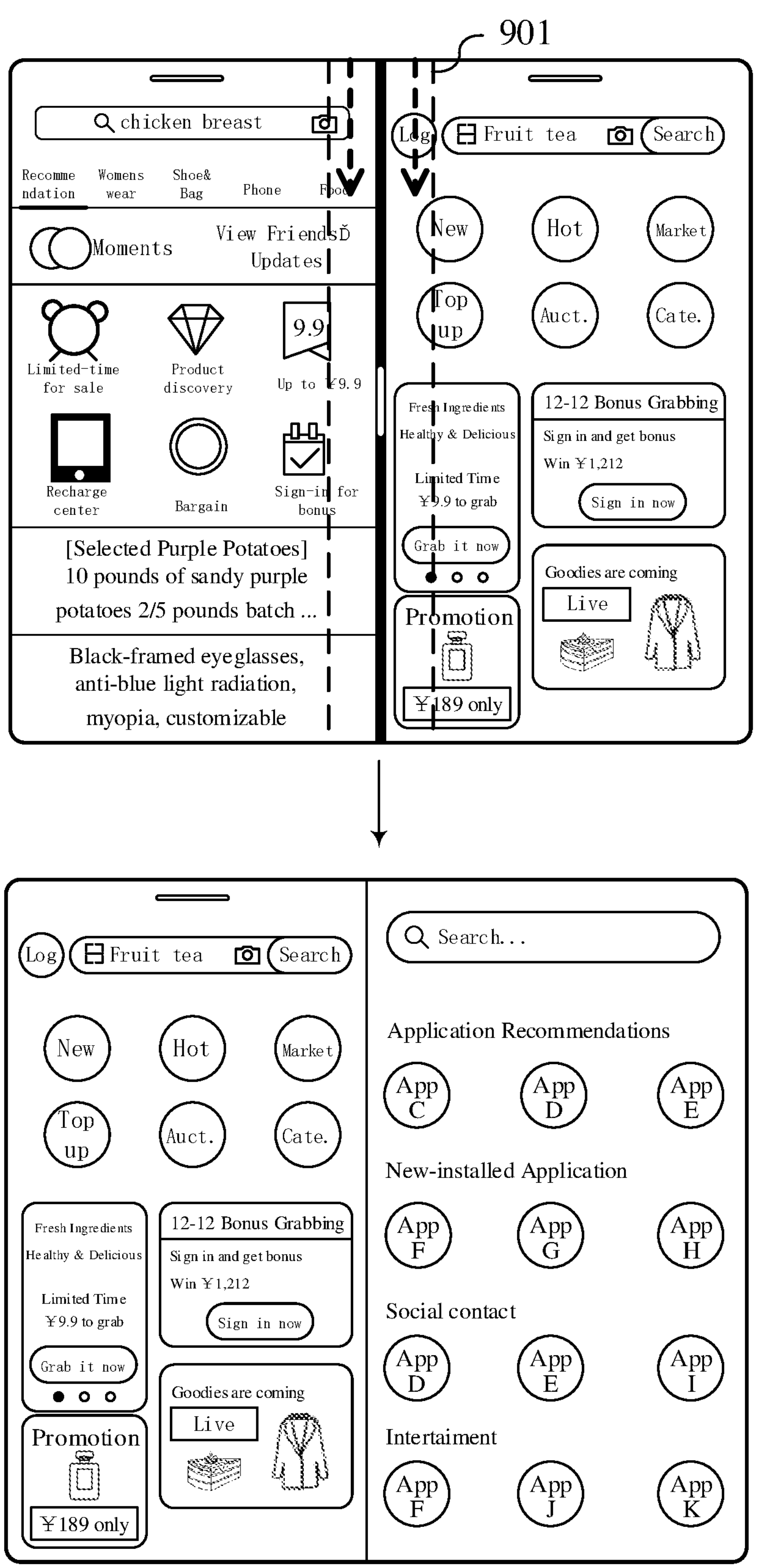
FIG. 9 is a schematic view of triggering to display an application selection list according to an embodiment of the present disclosure.

As illustrated in FIG. 9, when the terminal displays the application interface in a split-screen manner, a preset region at the junction of the application interface is the application add region 901, i.e., the region framed and selected by the broken lines in FIG. 9. The user may trigger the display of the application selection list by the second sliding operation in the application add region 901. In some embodiments, the second sliding operation is a sliding operation from top to bottom. In order to differentiate from the interface sliding operation within the application and to avoid mis-operation by the user, the number of touch points of the second sliding operation is different from the number of touch points of the interface sliding operation within the application. For example, the second sliding operation is a multi-touch-triggering sliding operation (two-finger sliding operation, etc.).

Alternatively, step 702*d*: receiving a third sliding operation of which a sliding start point is located at a predetermined edge of the display screen, and displaying the application selection list in a floating-window manner overlaid on the application interfaces of the first group of slit-screen applications.

Figure 10:
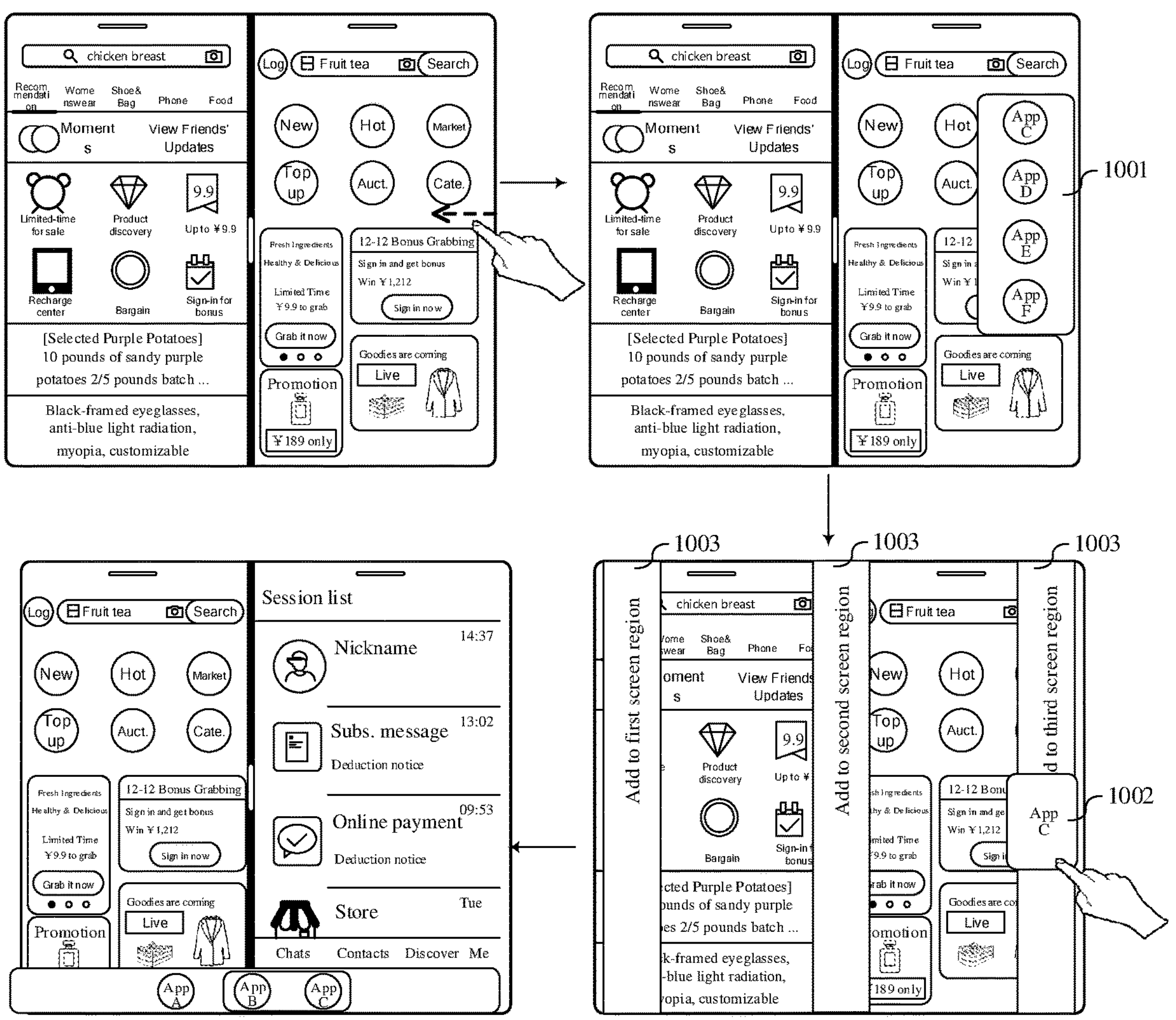
FIG. 10 is a schematic view of a process of adding a split-screen application according to another embodiment of the present disclosure.

In other embodiments, in order to avoid the application selection list occupying too much display region of the display screen, the terminal further provides an application selection list displayed superimposed by a floating window, the display of which is triggered by the user by the third sliding operation. Schematically, the third sliding operation is a lateral sliding operation. In order to distinguish the third sliding operation from the first sliding operation, the sliding starting point of the third sliding operation is located at a predetermined edge of the display screen (e.g., the right edge). As illustrated in FIG. 10, the terminal receives the third sliding operation with the sliding starting point located at the right edge of the display screen, and displays the application selection list 1001 through a floating window.

The above steps 702*a* to 702*b*, step 702*c*, and step 702*d* are three different ways of activating the application selection list, and are not executed in a sequential relationship.

Figure 11:
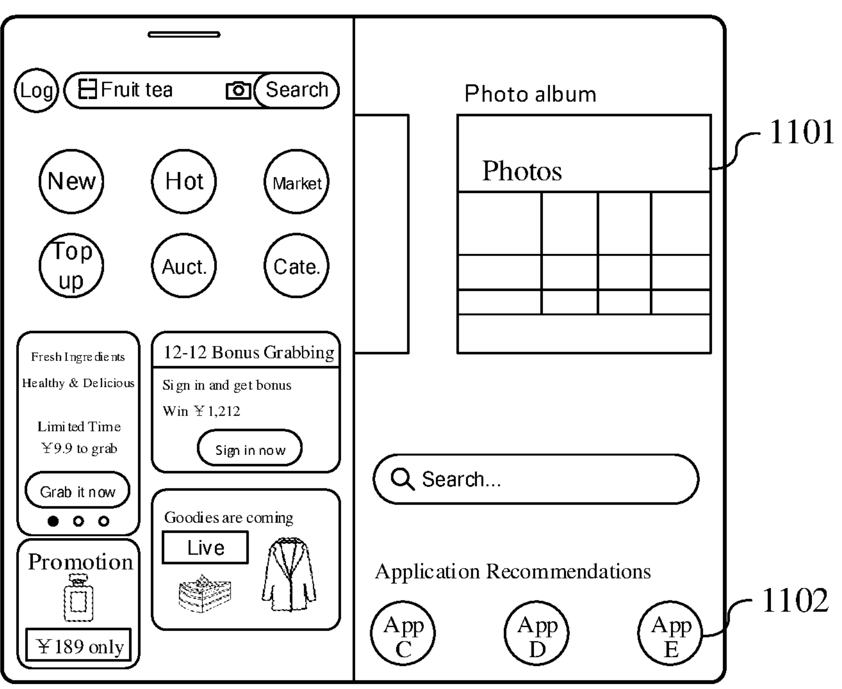
FIG. 11 is a schematic view of an application selection list according to an embodiment of the present disclosure.

In some embodiments, the application identifier in the application selection list includes at least one of an application interface thumbnail and an application icon. As illustrated in FIG. 11, since it is more likely that a user desires to use an application currently running in the background in the split-screen manner, an upper part of the application selection list displays an interface thumbnail 1101 of a background application that is currently not enabled with the split-screen function, and a lower part of the application selection list displays an application icon 1102 corresponding to each applications that is enabled with the split-screen function and support the split-screen function, thereby facilitating the user to quickly add a split-screen application, At block 703: receiving a triggering operation on a target application identifier in the application selection list, and adding a target application corresponding to the target application identifier to the split-screen applications.

In some embodiments, the step 703 includes the following steps.

Step 703*a*: receiving a click operation on the target application identifier and determining the target application as a (m+1)th split-screen application.

In some embodiments, the user causes the terminal to add the corresponding application to the split-screen applications by directly clicking on the application identifier. Schematically, as illustrated in FIG. 8, the application identifier is configured to trigger the addition of the corresponding application to the split-screen applications. When receiving the triggering operation on the application identifier of application C, the terminal determines application C as the (m+1)th (i.e., 3rd) split-screen application and determines the last n split-screen applications including application C (i.e., application B and application C) as the second group of split-screen applications.

Alternatively, step 703*b*: receiving a drag-and-drop operation on the target application identifier, and adding the target application to the split-screen applications and determining an order in which the m+1 split-screen applications are arranged based on an end position of the drag-and-drop operation.

In other embodiments, the user may autonomously control the position of the currently added split-screen applications among all the split-screen applications by the drag-and-drop operation on the application identifier. As illustrated in FIG. 10, when receiving a drag operation on the application identifier 1002 corresponding to application C, the terminal hides the application selection list 1001 and displays the interface add region 1003 (located at the edge position of each application interface) in the display screen, and displays a corresponding prompt text in the interface add region 1003. The user may drag the application identifier 1002 to any one of the interface add regions 1003 and release the application identifier 1002, such that the application interface corresponding to the application identifier 1002 is inserted into the region. As illustrated in FIG. 10, when the terminal determines that the drag-and-drop operation ends at the rightmost interface add region 1003, application C is added after application B, and application B and application C are determined to be the third group of split-screen applications.

At block 704: displaying the application interfaces of a third group of split-screen applications among the m+1 split-screen applications in the split-screen manner in the display screen, the third group of split-screen applications including the target application.

After the terminal adds the split-screen application, a group of split-screen applications required to be displayed, i.e., the third group of split-screen applications, is determined based on the newly added split-screen application, and the third group of split-screen applications includes the target application.

In the embodiments of the present disclosure, the terminal provides a variety of ways to add split-screen applications, and the user may select an appropriate way to trigger the display of the application selection list according to his or her own usage habits. Moreover, the user may either click on the application identifier in the application selection list to realize the rapid addition of split-screen applications, or control the arrangement order of the split-screen applications through the drag-and-drop operation on the application identifier, such that the group of split-screen applications required can be obtained, thereby improving the efficiency of adding split-screen applications and simplifying user operation.

In other embodiments, when the number of split-screen applications is less than or equal to n, the terminal displays the application interfaces of all the split-screen applications in the split-screen manner by dividing the display region of the display screen. When the total number of split-screen applications is n and the application add operation is received, the terminal starts a split-screen management application and displays the application interfaces in the split-screen manner by means of the above.

Figure 12:
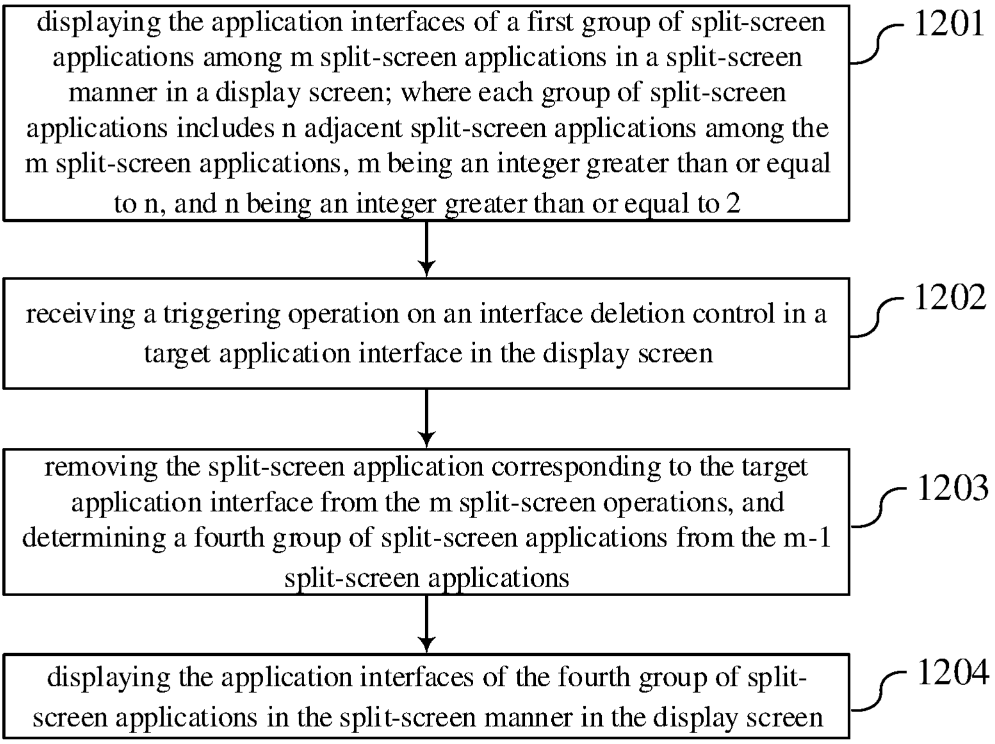
FIG. 12 is a flowchart of a method for displaying application interfaces according to still another embodiment of the present disclosure.

In some embodiments, when the user determines that he or she does not need to use a certain split-screen application, the user may close the split-screen application by a delete operation and cause the terminal to stop displaying the application interface of the split-screen application. FIG. 12 is a flowchart of a method for displaying application interfaces according to still another embodiment of the present disclosure. The present embodiment is illustrated with the method being applied to a terminal having a split-screen function as an example. The method includes the following operations at blocks illustrated in FIG. 12.

At block 1201: displaying the application interfaces of a first group of split-screen applications among m split-screen applications in a split-screen manner in a display screen; where each group of split-screen applications includes n adjacent split-screen applications among the m split-screen applications, m being an integer greater than or equal to n, and n being an integer greater than or equal to 2.

The specific implementation of step 1201 may refer to step 201 above, and the embodiments of the present disclosure will not be repeated herein.

At block 1202: receiving a triggering operation on an interface deletion control in a target application interface in the display screen.

In some embodiments, the terminal directly displays the corresponding interface deletion control inside each application interface; alternatively, the terminal displays a toolbar display control inside each application interface, and the user triggers the toolbar display control to trigger the display of a toolbar of a certain application interface, the toolbar including the interface deletion control. The embodiments of the present disclosure do not constitute any limitation in this regard.

Figure 13:
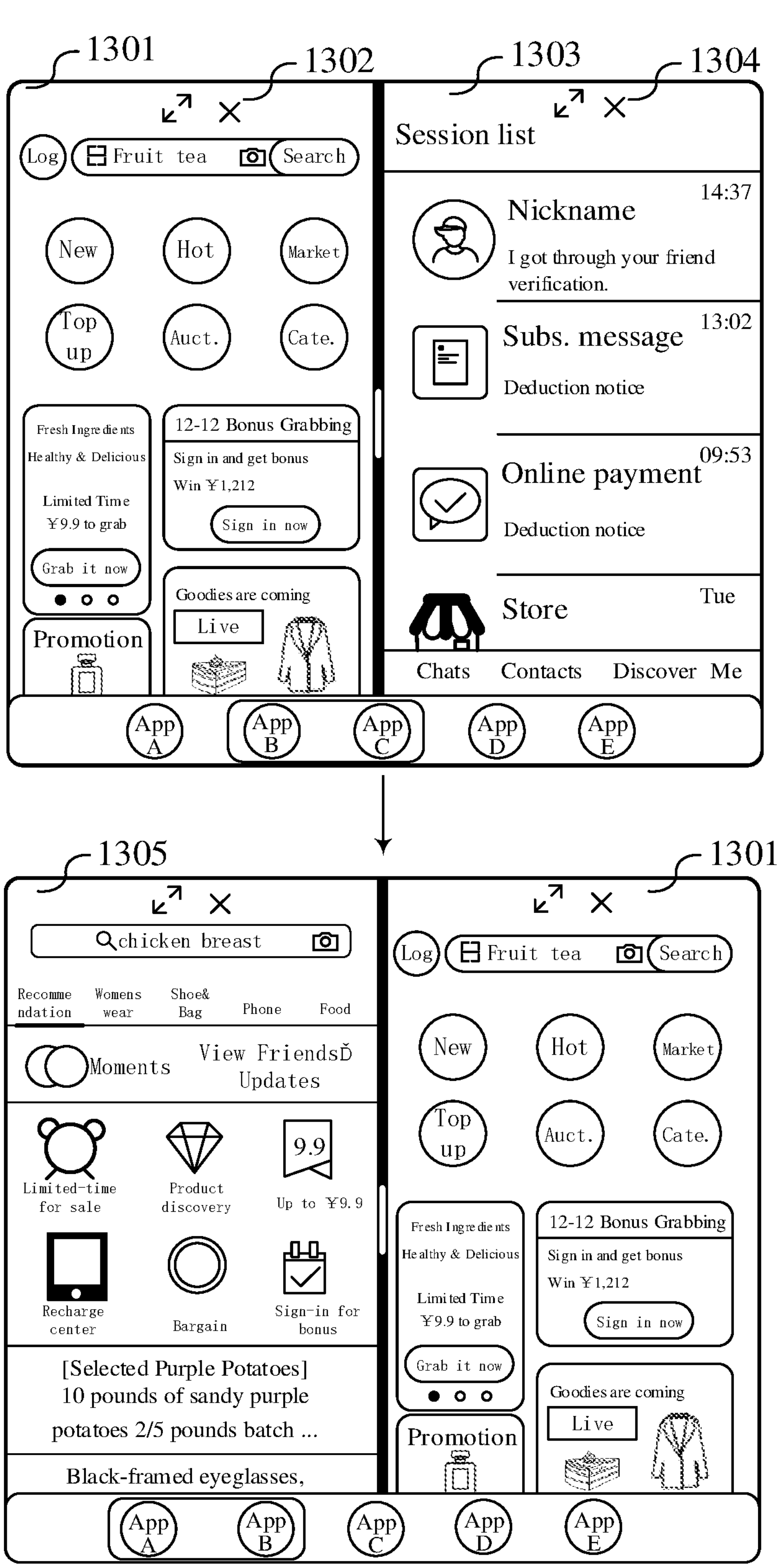
FIG. 13 is a schematic view of a process of deleting a split-screen application according to an embodiment of the present disclosure.

As illustrated in FIG. 13, an application interface 1301 of application B displayed in the display screen includes an interface deletion control 1302, and an application interface 1303 of application C includes an interface deletion control 1304.

At block 1203: removing the split-screen application corresponding to the target application interface from the m split-screen operations, and determining a fourth group of split-screen applications from the m−1 split-screen applications.

There is one different split-screen application between the fourth group of split-screen applications and the first group of split-screen applications. That is, after the terminal closes the split-screen application corresponding to the target application interface, the terminal determines one split-screen application from the remaining un-displayed split-screen applications and forms the fourth group of split-screen applications together with the other n−1 split-screen applications in the first group of split-screen applications. The terminal may add one of the m split-screen applications located after the first group of split-screen applications to the fourth group of split-screen applications, or add one of the m split-screen applications located before the first group of split-screen applications to the fourth group of split-screen applications, and the embodiments of the present disclosure do not constitute any limitation in this regard.

At block 1204: displaying the application interfaces of the fourth group of split-screen applications in the split-screen manner in the display screen.

Schematically, as illustrated in FIG. 13, when a triggering operation on the interface deletion control 1304 within the application interface 1303 is received, the terminal closes application C and stops displaying the application interface 1303, and determines application A and application B as the fourth group of split-screen applications, and displays the application interface 1305 of application A and the application interface 1301 of application B.

In the embodiments of the present disclosure, each application interface displayed by the terminal is correspondingly provided with an interface deletion control, such that the user directly may trigger the interface deletion control in the interface to close the corresponding split-screen application, so as to flexibly control the closing of the split-screen application.

In other embodiments, a full-screen control arranged correspondingly in each application interface, such that when the user wants to display an application interface in full-screen, the user may trigger the full-screen control in the interface to make the terminal control each split-screen application to exit the split-screen state and display the application interface in full-screen.

Figure 14:
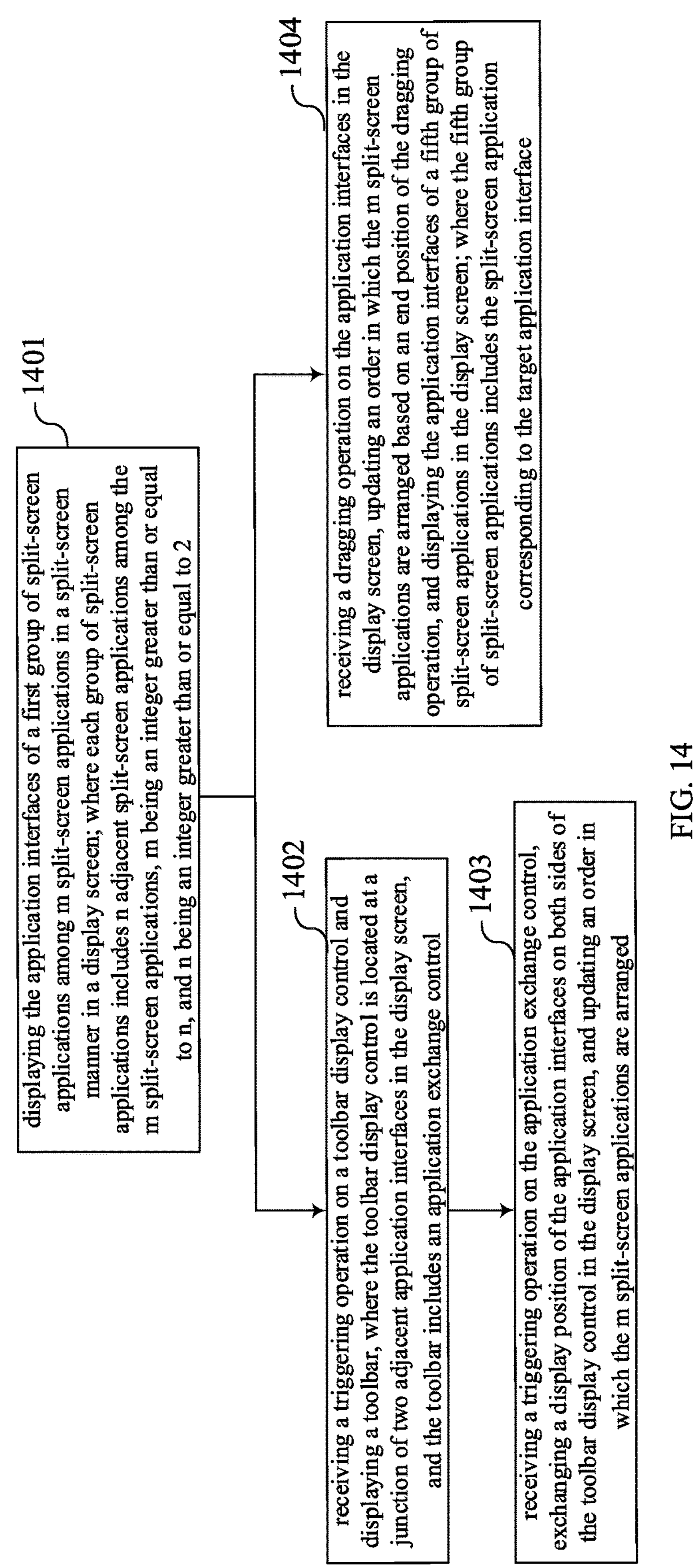
FIG. 14 is a flowchart of a method for displaying application interfaces according to still another embodiment of the present disclosure.

In the above embodiments, the split-screen applications have a fixed arrangement order, and the terminal displays and switches the application interfaces according to their arrangement order. In the embodiments of the present disclosure, in order to facilitate the user to use the split-screen application and to carry out free combinations based on their own needs, several ways to change the arrangement order of the split-screen application are provided. FIG. 14 is a flowchart of a method for displaying application interfaces according to still another embodiment of the present disclosure. The present embodiment is illustrated with the method being applied to a terminal having a split-screen function as an example. The method includes the following operations at blocks illustrated in FIG. 14.

At block 1401: displaying the application interfaces of a first group of split-screen applications among m split-screen applications in a split-screen manner in a display screen; where each group of split-screen applications includes n adjacent split-screen applications among the m split-screen applications, m being an integer greater than or equal to n, and n being an integer greater than or equal to 2.

The specific implementation of step 1401 may refer to step 201 above, and the embodiments of the present disclosure will not be repeated herein.

At block 1402: receiving a triggering operation on a toolbar display control and displaying a toolbar, where the toolbar display control is located at a junction of two adjacent application interfaces in the display screen, and the toolbar includes an application exchange control.

At block 1403: receiving a triggering operation on the application exchange control, exchanging a display position of the application interfaces on both sides of the toolbar display control in the display screen, and updating an order in which the m split-screen applications are arranged.

In some embodiments, the toolbar display control is displayed at the junction between any two application interfaces in the display screen, which is configured for triggering to display the toolbar, the toolbar including the application exchange control, the application add control, etc. The user may trigger the exchange control in the toolbar between any two application interfaces to cause the terminal to exchange the display positions of the application interfaces on both sides of the toolbar display control in the display screen, and also update the arrangement order of the corresponding two split-screen applications among the m split-screen applications.

Figure 15:
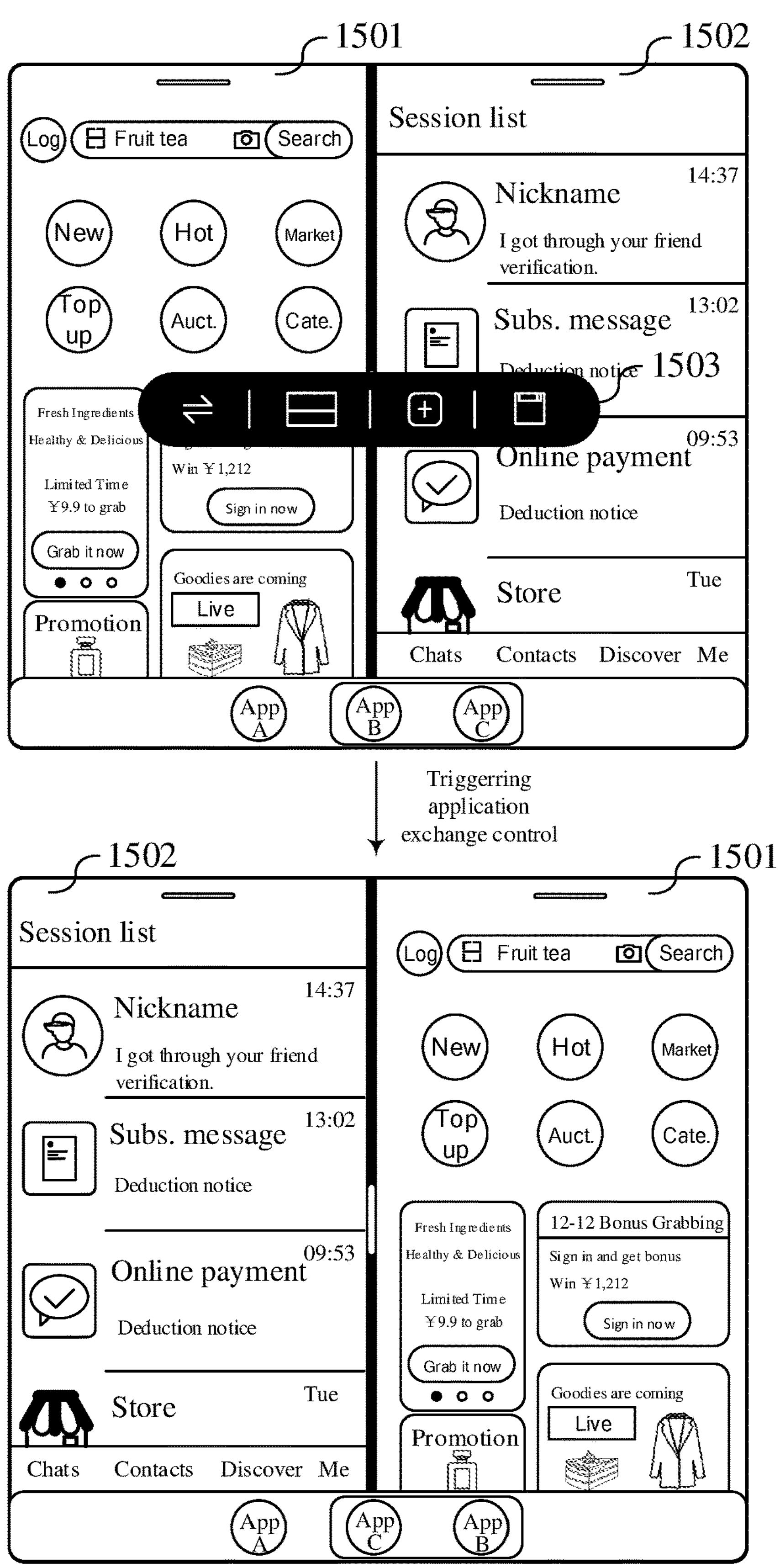
FIG. 15 is a schematic view of an application interface exchange process according to an embodiment of the present disclosure.

Schematically, as illustrated in FIG. 15, the terminal displays the application interfaces of the first group of split-screen applications (application B and application C). When receiving a triggering operation on the toolbar display control between the application interface 1501 of application B and the application interface 1502 of application C, the terminal displays the toolbar 1503 including the exchange control (i.e., the leftmost control in the toolbar 1503 in the figure). The terminal receives the triggering operation on the exchange control, exchanges the display positions of the application interface 1501 and the application interface 1502, and at the same time, the arrangement order of the split-screen applications is updated from application A, application B, and application C to application A, application C, and application B.

At block 1404: receiving a dragging operation on the application interfaces in the display screen, updating an order in which the m split-screen applications are arranged based on an end position of the dragging operation, and displaying the application interfaces of a fifth group of split-screen applications in the display screen; where the fifth group of split-screen applications includes the split-screen application corresponding to the target application interface. When the number of split-screen applications is large, and the user wants to move the application interface of a certain split-screen application to a farther position (for example, to move the first split-screen application to after the fifth split-screen application), if the above method of exchanging two by two is adopted, it may be necessary to trigger the exchange control several times in order to achieve the user's expected effect, and the operation is more cumbersome. In some embodiments, the user may cause the application interfaces of the m split-screen applications to enter a draggable state through a preset operation (e.g., a long-press operation), and drag any one of the application interfaces to an arbitrary position under the draggable state, so as to realize a flexible and free sorting of the split-screen applications.

The above steps 1402 to 1403, and step 1404 belong to two implementations and are not performed sequentially. The terminal determines the way to reorder the split-screen applications based on specific user operations.

In the embodiments of the present disclosure, two ways are provided to change the order of the split-screen applications, when the user wants to exchange the display positions of two adjacent application interfaces, the user may trigger the exchange control corresponding to the adjacent interface to realize the rapid exchange of the interface and the order of the split-screen applications; when the user wants to make a large change in the display order of the application interfaces of the split-screen application, the user may press the operation to make the application interface enter a draggable state, and drag any application interface to any position to freely change the arrangement order of the split-screen application.

Figure 16:
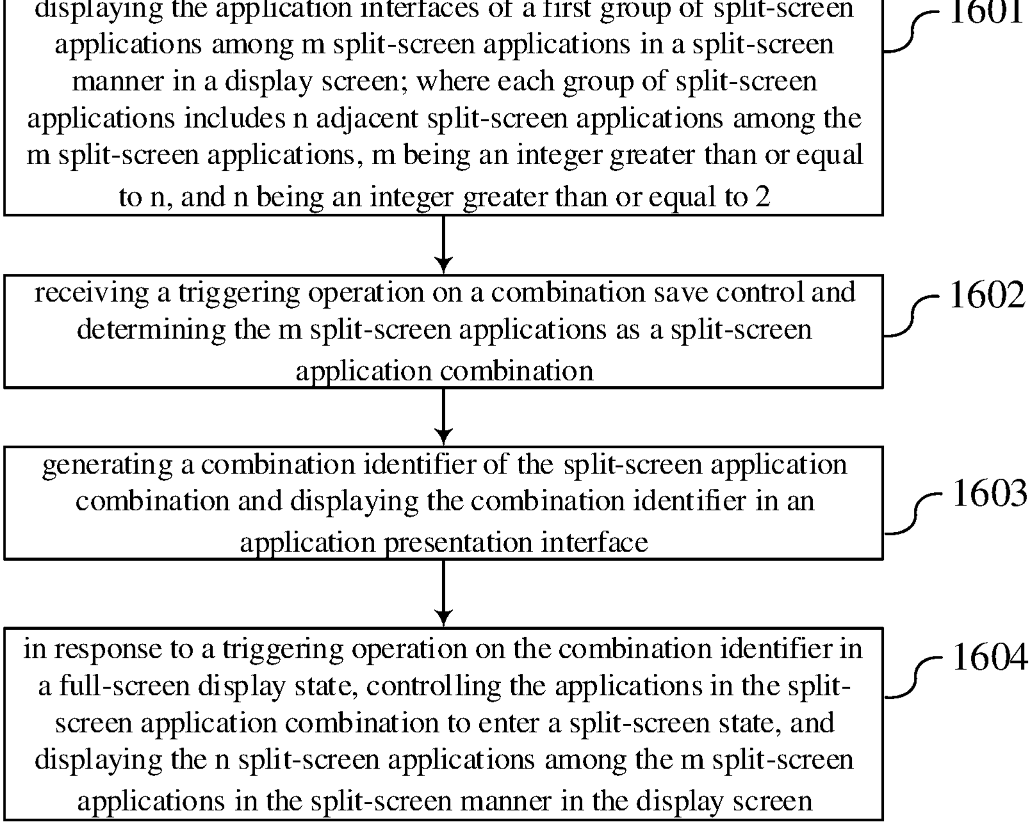
FIG. 16 is a flowchart of a method for displaying application interfaces according to still another embodiment of the present disclosure.

In some embodiments, the user may often need to use several fixed applications in the split-screen manner (e.g., several shopping applications in the split-screen manner to compare the prices of the same kind of goods in different shopping platforms, or applications such as mail applications, document editing applications, and other applications used for work in the split-screen manner). In order to further simplify the user's operation, the method for displaying the application interfaces in the embodiments of the present disclosure provides a split-screen combination saving mechanism, whereby the user may save multiple split-screen applications as a split-screen application combination, so as to quickly open the applications in the split-screen combination and use them in the split-screen manner in the future. FIG. 16 is a flowchart of a method for displaying application interfaces according to still another embodiment of the present disclosure. The present embodiment is illustrated with the method being applied to a terminal having a split-screen function as an example. The method includes the following operations at blocks illustrated in FIG. 16.

At block 1601: displaying the application interfaces of a first group of split-screen applications among m split-screen applications in a split-screen manner in a display screen; where each group of split-screen applications includes n adjacent split-screen applications among the m split-screen applications, m being an integer greater than or equal to n, and n being an integer greater than or equal to 2.

The specific implementation of step 1601 may refer to step 201 above, and the embodiments of the present disclosure will not be repeated herein.

At block 1602: receiving a triggering operation on a combination save control and determining the m split-screen applications as a split-screen application combination.

In some embodiments, when the terminal displays the application interfaces in the split-screen manner, the combination save control is displayed in the display screen or the combination save control is hidden in the toolbar. The user may cause the terminal to save the current m split-screen applications in the split-screen application combination by triggering the combination save control.

Schematically, as illustrated in FIG. 15, when a triggering operation on a toolbar display control between the application interface 1501 of application B and the application interface 1502 of application C is received, the toolbar 1503 is displayed, and the toolbar 1503 includes the combination save control, i.e., the rightmost control in the toolbar 1503.

At block 1603: generating a combination identifier of the split-screen application combination and displaying the combination identifier in an application presentation interface.

The application presentation interface includes a main system interface (i.e., the desktop) of the terminal, or other application display lists for displaying the installed applications of the terminal.

Figure 17:
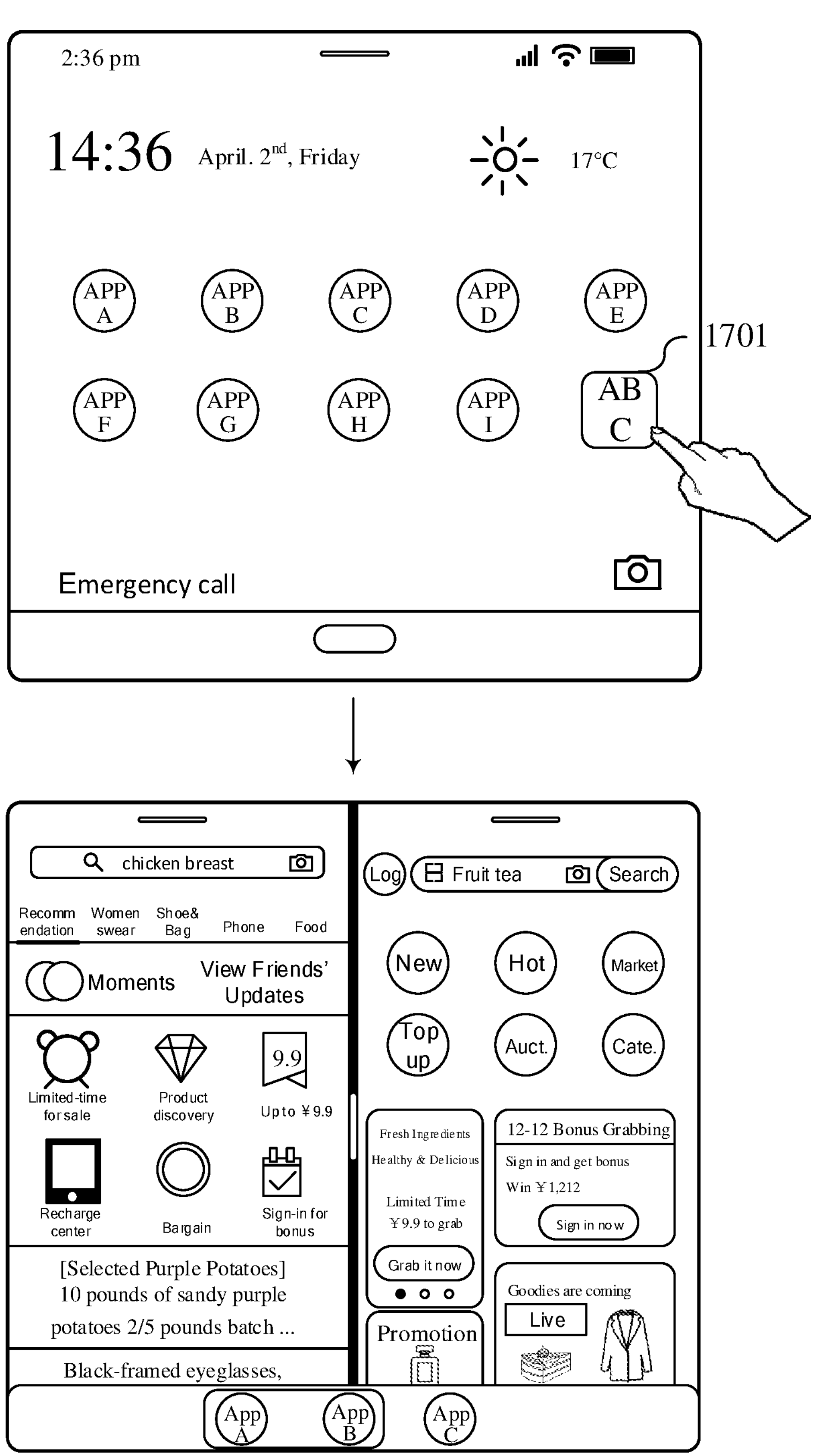
FIG. 17 is a schematic view of a process of triggering a combination identifier into a split-screen state according to an embodiment of the present disclosure.

Schematically, as illustrated in FIG. 17, in a case where application A, application B, and application C are enabled with the split-screen function, when the terminal receives a triggering operation on the combination save control, the combination identifier 1701 is generated for the split-screen application combination corresponding to application A, application B, and application C.

At block 1604: in response to a triggering operation on the combination identifier in a full-screen display state, controlling the applications in the split-screen application combination to enter a split-screen state, and displaying the n split-screen applications among the m split-screen applications in the split-screen manner in the display screen.

As illustrated in FIG. 17, when the terminal receives the triggering operation on the combination identifier 1701, the terminal directly opens application A, application B, and application C, and displays the application interfaces of application A and application B in the split-screen manner.

In some embodiments, the terminal provides a split-screen combination saving mechanism, whereby the user may save multiple split-screen applications as a split-screen application combination, such that the applications in the split-screen combination can be quickly opened and used in the split-screen manner in a subsequent period of time, thereby simplifying the user operation.

Figure 18:
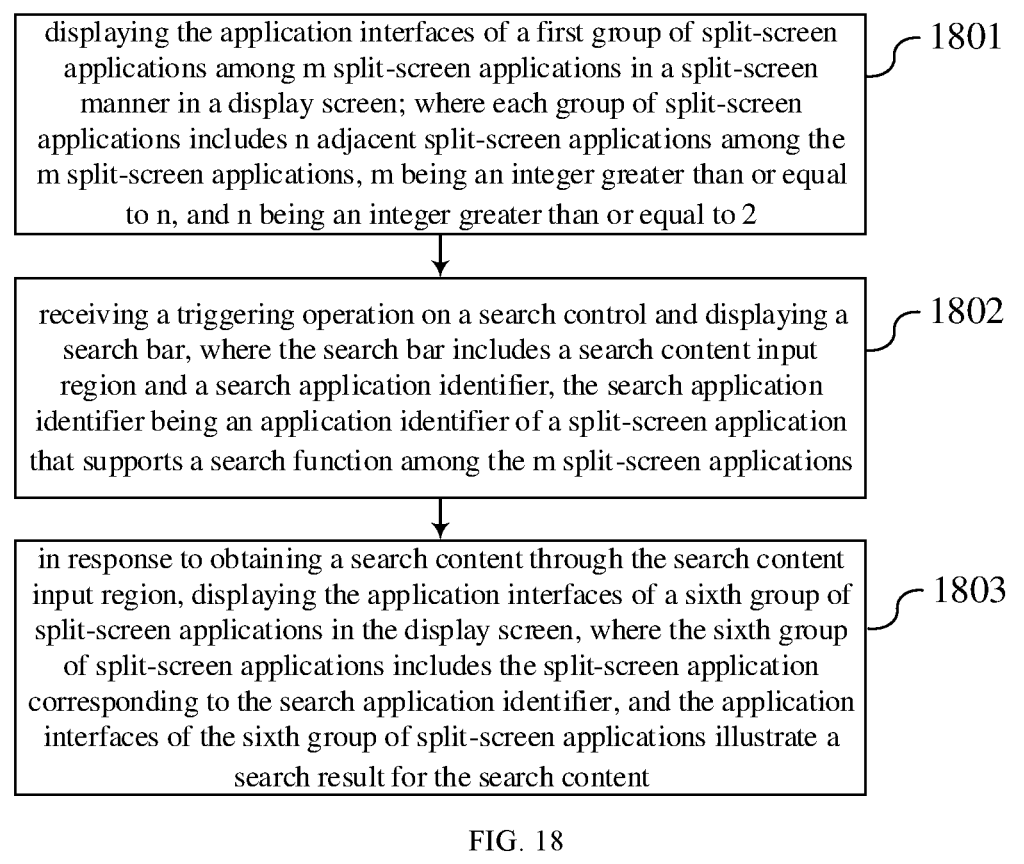

In some embodiments, the user may have the need to search for the same content in multiple split-screen applications, such as searching for a certain commodity in multiple shopping applications displayed in the split-screen manner to compare the price of the commodity in different shopping platforms, etc. When the user manually searches for the commodity in each split-screen application in turn, the process is more cumbersome. The embodiments of the present disclosure provide a "one-key for multiple search" mechanism, which enables the user to display the search results of multiple split-screen applications by only one search operation. FIG. 18 is a flowchart of a method for displaying application interfaces according to still another embodiment of the present disclosure. The present embodiment is illustrated with the method being applied to a terminal having a split-screen function as an example. The method includes the following operations at blocks illustrated in FIG. 18.

At block 1801: displaying the application interfaces of a first group of split-screen applications among m split-screen applications in a split-screen manner in a display screen; where each group of split-screen applications includes n adjacent split-screen applications among the m split-screen applications, m being an integer greater than or equal to n, and n being an integer greater than or equal to 2.

The specific implementation of step 1801 may refer to step 201 above, and the embodiments of the present disclosure will not be repeated herein.

At block 1802: receiving a triggering operation on a search control and displaying a search bar, where the search bar includes a search content input region and a search application identifier, the search application identifier being an application identifier of a split-screen application that supports a search function among the m split-screen applications.

The display region of the display screen includes an interface display region and a menu bar display region, the interface display region is configured to display the application interfaces of the split-screen applications, and the menu bar display region includes the search control.

Figures 19, 20:
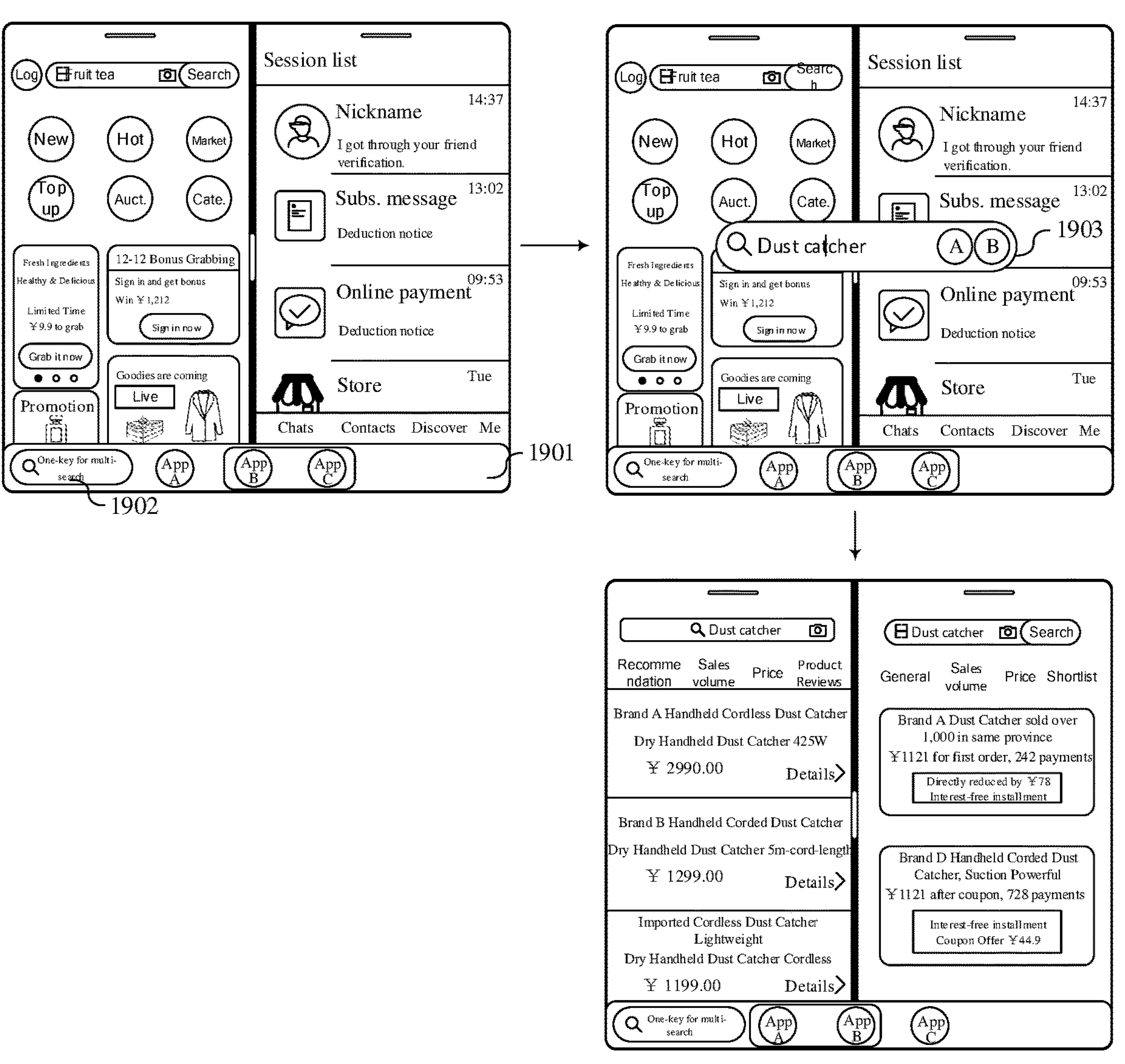
FIG. 19 is a schematic view of a content search process according to an embodiment of the present disclosure.
FIG. 20 is a structural block view of a device for displaying application interfaces according to an embodiment of the present disclosure.

As illustrated in FIG. 19, the display region of the display screen includes a menu bar display region 1901, and a search control 1902 is displayed in the menu bar display region 1901. The terminal receives a triggering operation on the search control 1902 and displays a search bar 1903, which displays application identifiers (i.e., application identifiers of application A and application B) of the split-screen applications that support the search function to prompt the user as to which applications are capable of supporting the searching operation, and the search bar 1903 is configured to obtain search content based on the received content input operation.

At block 1803: in response to obtaining a search content through the search content input region, displaying the application interfaces of a sixth group of split-screen applications in the display screen, where the sixth group of split-screen applications includes the split-screen application corresponding to the search application identifier, and the application interfaces of the sixth group of split-screen applications illustrate a search result for the search content.

In some embodiments, the step 1803 includes the following steps:

Step 1803*a*: obtaining the search content in response to a content input operation in the search content input region.

The terminal receives a click operation on the search content input region and displays a keyboard control such that the user may perform a content input operation using the keyboard control to input the search content. The terminal obtains the search content based on the user's content input operation.

Step 1803*b*: sending a broadcast message to the split-screen application corresponding to the search application identifier, where the broadcast message includes the search content and is configured to instruct the split-screen application to search content.

After the terminal obtains the search content, the terminal sends a broadcast message (e.g., the ACTION_MULTI_SEATCH broadcast in Android system) to the split-screen application having the search function among the m split-screen applications (i.e., the application corresponding to the application identifier displayed in the search bar), and the broadcast message carries the search content obtained by the terminal.

Step 1803*c*: displaying the application interfaces of the sixth group of split-screen applications in the display screen based on the search result from the split-screen application corresponding to the search application identifier.

After receiving the broadcast message, the split-screen applications execute an instruction to search for the search content and jump to respective search result interfaces, and the terminal displays the application interfaces of the sixth group of split-screen applications in the split-screen manner in the display screen, and the application interfaces of the sixth group of split-screen applications include at least one search result interface corresponding to the search content.

As illustrated in FIG. 19, the terminal obtains the search content "vacuum cleaner", sends the broadcast message including the search content to application A and application B. Application A and application B execute the search instruction and jump to respective search result interfaces. Application A and application B are the sixth group of split-screen applications, and the terminal displays the search result interface of application A and application B for "vacuum cleaner" in the split-screen manner.

In the embodiments of the present disclosure, the "one-key for multiple search" mechanism is provided, which enables the user to view the search results of multiple split-screen applications by only one search operation, avoiding the user from conducting search operations in each split-screen application in turn and the need to centrally adjust the various search result interfaces to enable them to be displayed in the split-screen manner at the same time, thereby improving the search efficiency.

FIG. 20 is a structural block view of a device for displaying application interfaces according to an embodiment of the present disclosure. The device includes the following elements.

A first display module 2001, configured to display the application interfaces of a first group of split-screen applications among m split-screen applications in a split-screen manner in a display screen; where each group of split-screen applications includes n adjacent split-screen applications among the m split-screen applications, m being an integer greater than or equal to n, and n being an integer greater than or equal to 2.

A first receiving module 2002, configured to receive an application switching operation.

A second display module 2003, configured to display the application interfaces of a second group of split-screen applications among the m split-screen applications in the split-screen manner in the display screen based on the application switching operation; where the second group of split-screen applications is partially or fully different from the first group of split-screen applications.

In some embodiments, the application switching operation is a first sliding operation of the application interfaces within the display screen.

The second display module 2003 includes the following elements.

A first determination unit, configured to determine the second group of split-screen applications based on a sliding direction and a sliding distance of the first sliding operation.

A first display unit, configured to display the application interfaces of the second group of split-screen applications in the split-screen manner in the display screen.

In some embodiments, the first determination unit is further configured to perform the following.

In response to an existence of other split-screen applications after the first group of split-screen applications among the m split-screen applications in the sliding direction of the first sliding operation, performing the step of determining the second group of split-screen applications based on a sliding direction and a sliding distance of the first sliding operation.

The device further includes the following elements.

A first control module, configured to, in response to no existence of other split-screen applications after the first group of split-screen applications among the m split-screen applications in the sliding direction of the first sliding operation, not respond to the first sliding operation.

In some embodiments, the display region of the display screen includes an interface display region and a menu bar display region, the interface display region being configured to display the application interfaces of split-screen applications, and the menu bar display region being configured to display split-screen application identifiers of the m split-screen applications; the application switching operation is a clicking operation on a target split-screen application identifier in the menu bar display region.

The second display module 2003 includes the following elements.

A second determination unit, configured to determine the second group of split-screen applications based on a target split-screen application corresponding to the target split-screen application identifier and an order in which the m split-screen applications are arranged, where the second group of split-screen applications includes the target split-screen application.

A second display, configured to display the application interfaces of the second group of split-screen applications in the split-screen manner in the display screen.

In some embodiments, a slider is further displayed in the menu bar display region, so as to frame and select the split-screen application identifiers of the n split-screen applications currently displayed, and the application switching operation is a drag-and-drop operation on the slider.

The second display module 2003 includes the following elements.

A third determination unit, configured to determine the second group of split-screen applications from the m split-screen applications based on an end position of a drag-and-drop operation.

A third display, configured to display the application interfaces of the second group of split-screen applications in the split-screen manner in the display screen.

In some embodiments, the device further includes the following elements.

A second receiving module, configured to receive an application add operation and display an application selection list, where the application selection list includes an application identifier corresponding to at least one application that is not enabled with the split-screen function.

A third receiving module, configured to receive a triggering operation on a target application identifier in the application selection list, and add a target application corresponding to the target application identifier to the split-screen applications.

A third display module, configured to display the application interfaces of a third group of split-screen applications among the m+1 split-screen applications in the split-screen manner in the display screen, the third group of split-screen applications including the target application.

In some embodiments, the second receiving module includes the following elements.

A first receiving unit, configured to receive a triggering operation on a toolbar display control and display a toolbar, where the toolbar display control is located at a junction of two adjacent application interfaces in the display screen, and the toolbar includes an application add control; receive a triggering operation on the application add control, and display the application selection list in the display screen.

Alternatively, a second receiving unit, configured to receive a second sliding operation within an application add region and display the application selection list in the display screen, where the application add region is located at a junction of two adjacent application interfaces in the display screen.

Alternatively, a third receiving module, configured to receive a third sliding operation of which a sliding start point is located at a predetermined edge of the display screen, and display the application selection list in a floating-window manner overlaid on the application interfaces of the first group of slit-screen applications.

In some embodiments, the third receiving module includes the following elements.

A fourth receiving unit, configured to receive a click operation on the target application identifier and determine the target application as a (m+1)th split-screen application.

Alternatively, a fifth receiving unit, configured to receive a drag-and-drop operation on the target application identifier, and add the target application to the split-screen applications and determine an order in which the m+1 split-screen applications are arranged based on an end position of the drag-and-drop operation.

In some embodiments, the device further includes the following elements.

A fourth receiving module, configured to receive a triggering operation on an interface deletion control in a target application interface in the display screen.

A deletion module, configured to remove the split-screen application corresponding to the target application interface from the m split-screen operations, and determine a fourth group of split-screen applications from the m−1 split-screen applications; where there is one different split-screen application between the fourth group of split-screen applications and the first group of split-screen applications.

A fourth display module, configured to display the application interfaces of the fourth group of split-screen applications in the split-screen manner in the display screen.

In some embodiments, the device further includes the following elements.

An exchange module, configured to receive a triggering operation on a toolbar display control and display a toolbar, where the toolbar display control is located at a junction of two adjacent application interfaces in the display screen, and the toolbar includes an application exchange control; receive a triggering operation on the application exchange control, exchange a display position of the application interfaces on both sides of the toolbar display control in the display screen, and update an order in which the m split-screen applications are arranged.

Alternatively, a sorting module, configured to receive a dragging operation on the application interfaces in the display screen, update an order in which the m split-screen applications are arranged based on an end position of the dragging operation, and display the application interfaces of a fifth group of split-screen applications in the display screen; where the fifth group of split-screen applications includes the split-screen application corresponding to the target application interface.

In some embodiments, the device further includes the following elements.

A fifth receiving module, configured to receive a triggering operation on a combination save control and determine the m split-screen applications as a split-screen application combination.

A generating module, configured to generate a combination identifier of the split-screen application combination and display the combination identifier in an application presentation interface.

A second control module, configured to, in response to a triggering operation on the combination identifier in a full-screen display state, control the applications in the split-screen application combination to enter a split-screen state, and display the n split-screen applications among the m split-screen applications in the split-screen manner in the display screen.

In some embodiments, the display region of the display screen includes an interface display region and a menu bar display region, the interface display region is configured to display the application interfaces of the split-screen applications, and the menu bar display region includes the search control.

The device further includes the following.

A fifth receiving module, configured to receive a triggering operation on a search control and display a search bar, where the search bar includes a search content input region and a search application identifier, the search application identifier being an application identifier of a split-screen application that supports a search function among the m split-screen applications.

A fifth display module, configured to, in response to obtaining a search content through the search content input region, display the application interfaces of a sixth group of split-screen applications in the display screen, where the sixth group of split-screen applications includes the split-screen application corresponding to the search application identifier, and the application interfaces of the sixth group of split-screen applications illustrate a search result for the search content.

In some embodiments, the fifth display module includes the following elements.

An obtaining unit, configured to obtain the search content in response to a content input operation in the search content input region.

A sending unit, configured to send a broadcast message to the split-screen application corresponding to the search application identifier, where the broadcast message includes the search content and is configured to instruct the split-screen application to search content.

A fourth display unit, configured to display the application interfaces of the sixth group of split-screen applications in the display screen based on the search result from the split-screen application corresponding to the search application identifier.

In summary, in the embodiments of the present disclosure, the display screen simultaneously displays the application interfaces of n split-screen applications, and the user may control more applications to be displayed in the split-screen manner, i.e., the number of split-screen applications is greater than the upper limit of the number of application interfaces simultaneously displayed on the display screen. The user may realize the rapid switching of the application interfaces of the split-screen applications in the display screen through the application switching operation. Compared to the way of displaying the application interfaces of all split-screen applications in the related art where the display region is divided into several sub-regions and the application interfaces of all the split-screen applications are displayed at the same time, the user may turn on multiple split-screen applications and cause the terminal to display the applications that need to be processed at present, thereby avoiding the situation that displaying the interfaces of all split-screen applications at the same time results in the size of each application interface being too small and the usability thereof being low, thus reasonably utilizing the display screen to carry out multi-tasking and improving the practicability of the split-screen function.

Figure 21:
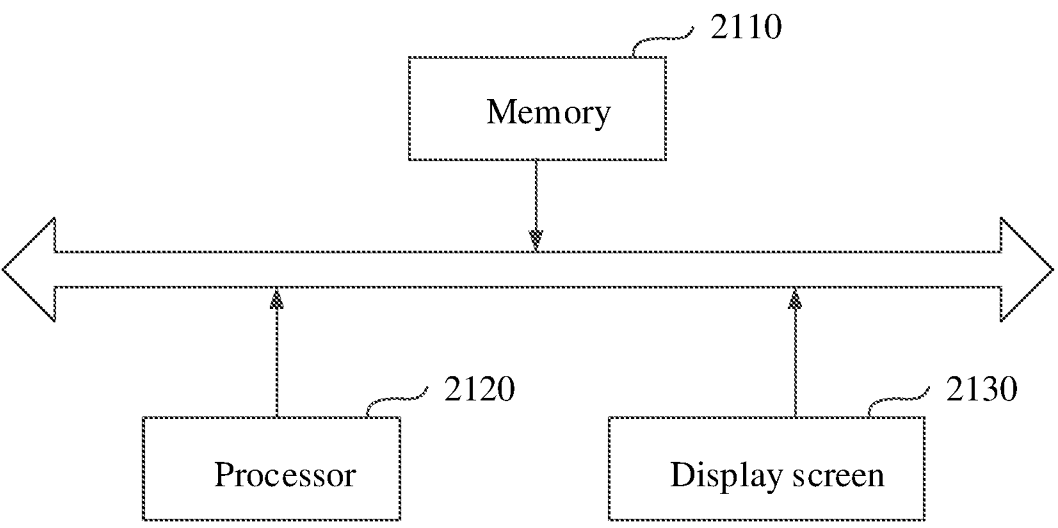
FIG. 21 is a structural block view of a terminal according to an embodiment of the present disclosure.

Referring to FIG. 21, FIG. 21 is a structural block view of a terminal 2100 according to an embodiment of the present disclosure. The terminal 2100 may be an electronic device such as a smartphone, a tablet computer, an e-book, a portable personal computer, and the like that has an application installed and running. The terminal 2100 in the present disclosure may include one or more of the following components: a processor 2120, a memory 2110, and a display screen 2130.

The processor 2120 may include one or more processing cores. The processor 2120 utilizes various interfaces and wiring to connect various parts throughout the terminal 2100 to perform various functions and process data of the terminal 2100 by running or executing instructions, programs, code sets, or instruction sets stored in the memory 2110, as well as calling up data stored in the memory 2110. In some embodiments, the processor 2120 may be implemented with at least one of digital signal processing (DSP), field-programmable gate array (FPGA), programmable logic array (PLA) in hardware form. The processor 2120 may integrate one or a combination of one or more of a central processing unit (CPU), a graphics processing unit (GPU), and a modem. The CPU is mainly configured to process the operating system, user interface, and applications, etc.; the GPU is configured to be responsible for rendering and drawing the content to be displayed by the display screen 2130; and the modem is configured to handle wireless communication. It is to be understood that the above modem may not be integrated into the processor 2120, and be implemented through a communication chip alone.

The memory 2110 may include random access memory (RAM) and/or read-only memory (ROM). In some embodiments, the memory 2110 includes a non-transitory computer-readable storage medium. The memory 2110 may be configured to store instructions, programs, code, code sets, or instruction sets. The memory 2110 may include a storage program region and a storage data region, where the storage program region may store instructions for implementing an operating system, instructions for implementing at least one function (e.g., a touch function, a sound playback function, an image playback function, etc.), instructions for implementing each of the above-described method embodiments, etc., and the operating system may be an Android system (including a system developed in depth based on the Android system), an IOS system developed by Apple (including a system developed in depth based on the IOS system), or other systems. The storage data region may further store data (e.g., phone book, audio/video data, chat log data) and the like created by the terminal 2100 during use.

The display screen 2130 may be a capacitive touch display, which is configured to receive touch operations by a user using a finger, a stylus, or any other suitable object on or near it, as well as to display a user interface for each application. The touch display is typically arranged on a front panel of the terminal 2100. The touch display may be designed as a full screen, a curved screen, or a shaped screen. The touch display may be designed as a combination of a full screen and a curved screen, and a combination of a shaped screen and a curved screen, which is not limited by the embodiments of the present disclosure.

In addition, those skilled in the art can understand that the structure of the terminal 2100 shown in the accompanying drawings does not constitute a limitation of the terminal 2100, and that the terminal may include more or fewer components than shown, or a combination of certain components, or a different arrangement of components. For example, the terminal 2100 may further include components such as an RF circuit, a picture-shooting component, a sensor, an audio circuit, a Wi-Fi component, a power supply, a Bluetooth component, and other components, which will not be described herein.

Embodiments of the present disclosure further provide a computer-readable storage medium storing at least one instruction, the at least one instruction being loaded and executed by a processor to realize the method for displaying application interfaces as described in various embodiments above.

According to an aspect of the present disclosure, a computer program product or computer program including computer instructions is provided, the computer instructions being stored in a computer-readable storage medium. A processor of the terminal reads the computer instructions from the computer-readable storage medium, and the processor executes the computer instructions such that the computer device performs the method for displaying application interfaces as described in various embodiments above.

It should be understood by those skilled in the art that in one or more of the above examples, the functionality described in the embodiments of the present disclosure may be implemented using hardware, software, firmware, or any combination thereof. When implemented using software, the functions may be stored in a computer-readable storage medium or transmitted as one or more instructions or code on the computer-readable storage medium. The computer-readable storage medium includes a computer storage medium and a communication medium, where the communication medium includes any medium that facilitates the transmission of a computer program from one location to another. The storage medium may be any available medium to which a general purpose or specialized computer has access.

The foregoing are only some embodiments of the present disclosure and are not intended to limit the present disclosure. Any modifications, equivalent substitutions, improvements, etc., made within the spirit and principles of the present disclosure shall be included in the scope of the present disclosure.

What is claimed is:

1. A method for displaying application interfaces, comprising:

displaying the application interfaces of a first group of split-screen applications among m split-screen applications in a split-screen manner in a display screen, wherein each group of split-screen applications comprises n adjacent split-screen applications among the m split-screen applications, m being an integer greater than or equal to n, and n being an integer greater than or equal to 2;

displaying the application interfaces of a second group of split-screen applications among the m split-screen applications in the split-screen manner in the display screen based on an application switching operation, wherein the second group of split-screen applications is partially or fully different from the first group of split-screen applications;

wherein a display region of the display screen comprises an interface display region and a menu bar display region, the interface display region being configured to display the application interfaces of the n adjacent split-screen applications, and the menu bar display region being configured to display split-screen application identifiers of the m split-screen applications; and the displaying the application interfaces of a second group of split-screen applications among the m split-screen applications in the split-screen manner in the display screen based on an application switching operation comprises:

receiving the application switching operation, wherein the application switching operation is a clicking operation on a target split-screen application identifier in the menu bar display region;

determining the second group of split-screen applications based on a target split-screen application corresponding to the target split-screen application identifier and an order in which the m split-screen applications are arranged and according to a principle of a minimum number of applications spaced apart between the first group of split-screen applications and the second group of split-screen applications, wherein the second group of split-screen applications comprises the target split-screen application; and displaying the application interfaces of the second group of split-screen applications in the split-screen manner in the display screen.

2. The method according to claim 1, wherein the displaying the application interfaces of a second group of split-screen applications among the m split-screen applications in the split-screen manner in the display screen based on an application switching operation further comprises:

receiving the application switching operation, wherein the application switching operation is a first sliding operation on the n application interfaces within the display screen; and determining the second group of split-screen applications based on a sliding direction and a sliding distance of the first sliding operation.

3. The method according to claim 2, wherein the determining the second group of split-screen applications based on a sliding direction and a sliding distance of the first sliding operation comprises:

in response to an existence of another split-screen application after the first group of split-screen applications among the m split-screen applications in the sliding direction of the first sliding operation, performing the step of determining the second group of split-screen applications based on a sliding direction and a sliding distance of the first sliding operation; wherein the method further comprises:

in response to no existence of another split-screen application after the first group of split-screen applications among the m split-screen applications in the sliding direction of the first sliding operation, not responding to the first sliding operation.

4. The method according to claim 2, wherein the determining the second group of split-screen applications based on a sliding direction and a sliding distance of the first sliding operation comprises:

switching one split-screen application by default based on the sliding distance of the first sliding operation, wherein the sliding distance of the first sliding operation reaches a distance required to switch one split-screen application.

5. The method according to claim 1, wherein a slider is further displayed in the menu bar display region, the slider being configured to frame and select the split-screen application identifiers of the n split-screen applications currently displayed; and the displaying the application interfaces of a second group of split-screen applications among the m split-screen applications in the split-screen manner in the display screen based on an application switching operation further comprises:

receiving the application switching operation, wherein the application switching operation is a drag-and-drop operation on the slider; and determining the second group of split-screen applications from the m split-screen applications based on an end position of the drag-and-drop operation.

6. The method according to claim 1, after the displaying the application interfaces of a first group of split-screen applications among m split-screen applications in a split-screen manner in a display screen, further comprising:

receiving an application add operation and displaying an application selection list, wherein the application selection list comprises an application identifier corresponding to each of at least one application that is not enabled with the split-screen function;

receiving a triggering operation on a target application identifier in the application selection list, and adding a target application corresponding to the target application identifier to the m split-screen applications; and displaying the application interfaces of a third group of split-screen applications among the m+1 split-screen applications in the split-screen manner in the display screen, wherein the third group of split-screen applications comprises the target application.

7. The method according to claim 6, wherein the receiving an application add operation and displaying an application selection list comprise:

receiving a triggering operation on a toolbar display control and displaying a toolbar, wherein the toolbar display control is located at a junction of two adjacent application interfaces among the n adjacent application interfaces, and the toolbar comprises an application add control; and receiving a triggering operation on the application add control, and displaying the application selection list in the display screen;

or, receiving a second sliding operation within an application add region and displaying the application selection list in the display screen, wherein the application add region is located at a junction of two adjacent application interfaces among the n adjacent application interfaces;

or, receiving a third sliding operation of which a sliding start point is located at a predetermined edge of the display screen, and displaying the application selection list in a floating-window manner overlaid on the application interfaces of the first group of slit-screen applications.

8. The method according to claim 6, wherein the receiving a triggering operation on a target application identifier in the application selection list, and adding a target application corresponding to the target application identifier to the m split-screen applications comprise:

receiving a click operation on the target application identifier and determining the target application as a (m+1) th split-screen application; or, or, receiving a drag-and-drop operation on the target application identifier, and adding the target application to the m split-screen applications and determining an order in which the m+1 split-screen applications are arranged based on an end position of the drag-and-drop operation.

9. The method according to claim 1, after the displaying the application interfaces of a first group of split-screen applications among m split-screen applications in a split-screen manner in a display screen, further comprising:

receiving a triggering operation on an interface deletion control in a target application interface in the display screen;

removing a split-screen application corresponding to the target application interface from the m split-screen operations, and determining a fourth group of split-screen applications from the m−1 split-screen applications, wherein there is one different split-screen application between the fourth group of split-screen applications and the first group of split-screen applications; and displaying the application interfaces of the fourth group of split-screen applications in the split-screen manner in the display screen.

10. The method according to claim 1, after the displaying the application interfaces of a first group of split-screen applications among m split-screen applications in a split-screen manner in a display screen, further comprising:

receiving a triggering operation on a toolbar display control and displaying a toolbar, wherein the toolbar display control is located at a junction of two adjacent application interfaces among the n adjacent application interfaces, and the toolbar comprises an application exchange control; and receiving a triggering operation on the application exchange control, exchanging a display position of the two adjacent application interfaces on both sides of the toolbar display control in the display screen, and updating an order in which the m split-screen applications are arranged;

or, receiving a dragging operation on the n adjacent application interfaces in the display screen, updating an order in which the m split-screen applications are arranged based on an end position of the dragging operation, and displaying the application interfaces of a fifth group of split-screen applications in the display screen, wherein the fifth group of split-screen applications comprises a split-screen application corresponding to a target application interface.

11. The method according to claim 1, after the displaying the application interfaces of a first group of split-screen applications among m split-screen applications in a split-screen manner in a display screen, further comprising:

receiving a triggering operation on a combination save control and determining the m split-screen applications as a split-screen application combination;

generating a combination identifier of the split-screen application combination and displaying the combination identifier in an application presentation interface; and controlling applications in the split-screen application combination to enter a split-screen state based on a triggering operation on the combination identifier in a full-screen display state, and displaying the n split-screen applications among the m split-screen applications in the split-screen manner in the display screen.

12. The method according to claim 1, wherein a display region of the display screen comprises an interface display region and a menu bar display region, the interface display region is configured to display the application interfaces of the n adjacent split-screen applications, and the menu bar display region comprises a search control;

wherein after the displaying the application interfaces of a first group of split-screen applications among m split-screen applications in a split-screen manner in a display screen, the method further comprises:

receiving a triggering operation on a search control and displaying a search bar, wherein the search bar comprises a search content input region and a search application identifier, the search application identifier being an application identifier of a split-screen application that supports a search function among the m split-screen application; and displaying the application interfaces of a sixth group of split-screen applications in the display screen based on a search content obtained through the search content input region, wherein the sixth group of split-screen applications comprises the split-screen application corresponding to the search application identifier, and the application interfaces of the sixth group of split-screen applications illustrate a search result for the search content.

13. The method according to claim 12, wherein the displaying the application interfaces of a sixth group of split-screen applications in the display screen based on a search content obtained through the search content input region comprises:

sending a broadcast message to the split-screen application corresponding to the search application identifier, wherein the broadcast message comprises the search content and is configured to instruct the split-screen application to search content; and displaying the application interfaces of the sixth group of split-screen applications in the display screen based on the search result from the split-screen application corresponding to the search application identifier.

14. A terminal, comprising a processor and a memory; wherein the memory stores at least one instruction, at least one segment of a program, a code set, or an instruction set, and when the at least one instruction, the at least one segment of the program, the code set, or the instruction set is loaded and executed by the processor, the processor is caused to perform:

displaying the application interfaces of a first group of split-screen applications among m split-screen applications in a split-screen manner in a display screen, wherein each group of split-screen applications comprises n adjacent split-screen applications among the m split-screen applications, m being an integer greater than or equal to n, and n being an integer greater than or equal to 2;

receiving an application switching operation; and displaying the application interfaces of a second group of split-screen applications among the m split-screen applications in the split-screen manner in the display screen based on the application switching operation, wherein the second group of split-screen applications is partially or fully different from the first group of split-screen applications;

wherein a display region of the display screen comprises an interface display region and a menu bar display region, the interface display region being configured to display the application interfaces of the n adjacent split-screen applications, and the menu bar display region being configured to display split-screen application identifiers of the m split-screen applications; and in a case where the application switching operation is a clicking operation on a target split-screen application identifier in the menu bar display region, the displaying the application interfaces of a second group of split-screen applications among the m split-screen applications in the split-screen manner in the display screen based on the application switching operation comprises:

determining the second group of split-screen applications based on a target split-screen application corresponding to the target split-screen application identifier and an order in which the m split-screen applications are arranged and according to a principle of a minimum number of applications spaced apart between the first group of split-screen applications and the second group of split-screen applications, wherein the second group of split-screen applications comprises the target split-screen application; and displaying the application interfaces of the second group of split-screen applications in the split-screen manner in the display screen.

15. The terminal according to claim 14, wherein the application switching operation is a first sliding operation on the n application interfaces within the display screen;

the displaying the application interfaces of a second group of split-screen applications among the m split-screen applications in the split-screen manner in the display screen based on the application switching operation comprises:

determining the second group of split-screen applications based on a sliding direction and a sliding distance of the first sliding operation; and displaying the application interfaces of the second group of split-screen applications in the split-screen manner in the display screen.

16. The terminal according to claim 14, wherein after the displaying the application interfaces of a first group of split-screen applications among m split-screen applications in a split-screen manner in a display screen, the processor is caused to further perform:

receiving an application add operation and displaying an application selection list, wherein the application selection list comprises an application identifier corresponding to each of at least one application that is not enabled with the split-screen function;

receiving a triggering operation on a target application identifier in the application selection list, and adding a target application corresponding to the target application identifier to the m split-screen applications; and displaying the application interfaces of a third group of split-screen applications among the m+1 split-screen applications in the split-screen manner in the display screen, wherein the third group of split-screen applications comprises the target application.

17. The terminal according to claim 14, wherein after the displaying the application interfaces of a first group of split-screen applications among m split-screen applications in a split-screen manner in a display screen, the processor is caused to further perform:

receiving a triggering operation on an interface deletion control in a target application interface in the display screen;

removing a split-screen application corresponding to the target application interface from the m split-screen operations, and determining a fourth group of split-screen applications from the m−1 split-screen applications, wherein there is one different split-screen application between the fourth group of split-screen applications and the first group of split-screen applications; and displaying the application interfaces of the fourth group of split-screen applications in the split-screen manner in the display screen.

18. A non-transitory computer-readable storage medium, storing at least one computer program; wherein when the at least one computer program is loaded and executed by a processor, the processor is caused to perform:

displaying the application interfaces of a first group of split-screen applications among m split-screen applications in a split-screen manner in a display screen, wherein each group of split-screen applications comprises n adjacent split-screen applications among the m split-screen applications, m being an integer greater than or equal to n, and n being an integer greater than or equal to 2;

receiving an application switching operation; and displaying the application interfaces of a second group of split-screen applications among the m split-screen applications in the split-screen manner in the display screen based on the application switching operation, wherein the second group of split-screen applications is partially or fully different from the first group of split-screen applications;

wherein a display region of the display screen comprises an interface display region and a menu bar display region, the interface display region being configured to display the application interfaces of the n adjacent split-screen applications, and the menu bar display region being configured to display split-screen application identifiers of the m split-screen applications; and in a case where the application switching operation is a clicking operation on a target split-screen application identifier in the menu bar display region, the displaying the application interfaces of a second group of split-screen applications among the m split-screen applications in the split-screen manner in the display screen based on the application switching operation comprises:

determining the second group of split-screen applications based on a target split-screen application corresponding to the target split-screen application identifier and an order in which the m split-screen applications are arranged and according to a principle of a minimum number of applications spaced apart between the first group of split-screen applications and the second group of split-screen applications, wherein the second group of split-screen applications comprises the target split-screen application; and displaying the application interfaces of the second group of split-screen applications in the split-screen manner in the display screen.

* * * * *